United States Patent
Biskeborn et al.

(10) Patent No.: US 11,514,929 B2
(45) Date of Patent: Nov. 29, 2022

(54) MAGNETIC RECORDING HEAD HAVING SAME-GAP READ-AFTER-WRITE

(71) Applicant: Western Digital Technologies, Inc., San Jose, CA (US)

(72) Inventors: Robert G. Biskeborn, Hollister, CA (US); David J. Seagle, Morgan Hill, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/232,704

(22) Filed: Apr. 16, 2021

(65) Prior Publication Data
US 2022/0319540 A1 Oct. 6, 2022

Related U.S. Application Data

(60) Provisional application No. 63/168,066, filed on Mar. 30, 2021.

(51) Int. Cl.
*G11B 5/127* (2006.01)
*G11B 5/008* (2006.01)
(Continued)

(52) U.S. Cl.
CPC ............ *G11B 5/00813* (2013.01); *G11B 5/23* (2013.01); *G11B 5/584* (2013.01)

(58) Field of Classification Search
None
See application file for complete search history.

(56) References Cited

U.S. PATENT DOCUMENTS

| | | | |
|---|---|---|---|
| 3,806,902 | A | 4/1974 | Drees et al. |
| 4,636,902 | A | 1/1987 | Dalziel et al. |

(Continued)

FOREIGN PATENT DOCUMENTS

| | | |
|---|---|---|
| EP | 0747888 B1 | 9/2001 |
| EP | 1369865 A2 | 12/2003 |
| WO | 0137276 A1 | 5/2001 |

OTHER PUBLICATIONS

"Storage Networking Fundamentals: Storage Devices", Cisco Press, Mar. 4, 2005, pp. 1-4, https://www.ciscopress.com/articles/article.asp?p=372010&seqNum=2, Last accessed Mar. 15, 2021.

(Continued)

*Primary Examiner* — Peter Vincent Agustin
(74) *Attorney, Agent, or Firm* — Patterson & Sheridan, LLP; Steven. H. VerSteeg

(57) ABSTRACT

The present disclosure generally relates to a tape head and a tape head drive including a tape head. The tape head comprises at least one same gap verify (SGV) module comprising a closure, a substrate, and a plurality of write transducer and read transducer pairs. The write transducer and the read transducer of each pair are spaced a first distance in a first direction of about 5 μm to about 20 μm. The SGV module head assembly is configured to write data to a tape using the write transducer of each pair and read verify the data written on the tape using the read transducer of each pair such that the write transducer and read transducer of each pair are concurrently operable. In some embodiments, the SGV module head assembly is further configured for dynamic tilting to enable correcting of misregistration caused by tape lateral dimension changes.

37 Claims, 12 Drawing Sheets

(51) Int. Cl.
  *G11B 5/584* (2006.01)
  *G11B 5/23* (2006.01)

(56) References Cited

U.S. PATENT DOCUMENTS

| | | | |
|---|---|---|---|
| 5,940,250 A * | 8/1999 | McNeil | G11B 5/3116 |
| | | | 360/246.6 |
| 6,038,108 A | 3/2000 | Dee et al. | |
| 6,477,008 B1 | 11/2002 | Chang et al. | |
| 6,826,140 B2 | 11/2004 | Brommer et al. | |
| 7,551,393 B2 * | 6/2009 | Biskeborn | G11B 5/4893 |
| | | | 360/121 |
| 8,089,722 B2 | 1/2012 | Iben et al. | |
| 8,254,058 B2 | 8/2012 | Biskebom | |
| 8,687,324 B2 | 4/2014 | Biskeborn et al. | |
| 9,007,712 B1 | 4/2015 | Biskebom et al. | |
| 9,129,631 B1 | 9/2015 | Biskeborn et al. | |
| 9,177,580 B1 | 11/2015 | Vanderheyden et al. | |
| 9,218,838 B2 | 12/2015 | Biskeborn et al. | |
| 9,251,844 B1 * | 2/2016 | Wheelock | G11B 20/10018 |
| 9,299,368 B2 | 3/2016 | Biskebom et al. | |
| 10,014,017 B1 | 7/2018 | Breuer et al. | |
| 10,902,882 B1 | 1/2021 | Biskebom | |
| 2001/0016271 A1 | 8/2001 | Aoyama | |
| 2003/0214753 A1 | 11/2003 | Hsu et al. | |
| 2005/0018349 A1 | 1/2005 | Eaton | |
| 2005/0036227 A1 * | 2/2005 | Hoerger | G11B 15/125 |
| | | | 360/63 |
| 2006/0039082 A1 | 2/2006 | Biskeborn et al. | |
| 2006/0092575 A1 | 5/2006 | Mochizuki et al. | |
| 2007/0047122 A1 | 3/2007 | Czarnecki et al. | |
| 2007/0133131 A1 | 6/2007 | Biskeborn | |
| 2007/0146929 A1 | 6/2007 | Maruyama et al. | |
| 2007/0223142 A1 | 9/2007 | Takekuma et al. | |
| 2007/0254189 A1 | 11/2007 | Nakagawa et al. | |
| 2008/0151436 A1 | 6/2008 | Sato et al. | |
| 2008/0316632 A1 | 12/2008 | Czarnecki et al. | |
| 2009/0168241 A1 | 7/2009 | Mochizuki et al. | |
| 2011/0222187 A1 | 9/2011 | Biskeborn | |
| 2013/0100554 A1 | 4/2013 | Biskeborn et al. | |
| 2014/0198403 A1 | 7/2014 | Biskeborn et al. | |
| 2015/0138673 A1 | 5/2015 | Adrong et al. | |
| 2015/0262596 A1 | 9/2015 | Zuckerman et al. | |
| 2020/0219531 A1 * | 7/2020 | Biskeborn | G11B 5/00813 |

OTHER PUBLICATIONS

Wang, Zhi Gang et al., "Crossfeed Problems in Read-While-Write Tape Heads", IEEE Transactions on Magnetics, vol. 33, No. 4, Jul. 1997, pp. 2531-2537.

International Search Report and the Written Opinion for International Application No. PCT/US2021/035171 dated Aug. 29, 2021, 13 pages.

Biskeborn, Robert G. et al., "TMR tape drive for a 15 TB cartridge", AIP Publishing, Dec. 2017, https://aip.scitation.org/doi/10.1063/1.5007788, Last accessed Jun. 22, 2021.

* cited by examiner

MAGNETIC RECORDING HEAD HAVING SAME-GAP READ-AFTER-WRITE

CROSS-REFERENCE TO RELATED APPLICATIONS

This application claims benefit of U.S. provisional patent application Ser. No. 63/168,066, filed Mar. 30, 2021, which is herein incorporated by reference.

BACKGROUND OF THE DISCLOSURE

Field of the Disclosure

Embodiments of the present disclosure generally relate to a tape head and a tape head drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, for various reasons, enabling read-verify for conventional tape heads requires use of two or more separate head structures, where one structure write the data and the other read-verifies the data. A drawback is that the separate structures in conventional heads must be very precisely assembled to enable this function. Another drawback is that the heads are more susceptible to mis-registration between reader and upstream writer caused by tape skew, as a result of the unavoidable separation between the two. Yet another drawback is the time delay between the writing and the read-verifying may lead to a loss of data due to having to re-write larger blocks of data when an uncorrectable error occurs.

Therefore, there is a need in the art for a tape head configured to write and read verifying data within a single head structure.

SUMMARY OF THE DISCLOSURE

The present disclosure generally relates to a tape head and a tape head drive including a tape head. The tape head comprises at least one same gap verify (SGV) module comprising a closure, a substrate, and a plurality of write transducer and read transducer pairs. The write transducer and the read transducer of each pair are spaced a first distance in a first direction of about 5 µm to about 20 µm. The SGV module head assembly is configured to write data to a tape using the write transducer of each pair and read verify the data written on the tape using the read transducer of each pair such that the write transducer and read transducer of each pair are concurrently operable. In some embodiments, the SGV module head assembly is further configured for dynamic tilting to enable correcting of mis-registration caused by tape lateral dimension changes.

In one embodiment, a same gap verify (SGV) module head assembly comprises a closure, a substrate disposed adjacent to the closure, and a plurality of write transducer and read transducer pairs disposed between the closure and the substrate. The write transducer and the read transducer of each pair are spaced a first distance in a first direction of about 5 µm to about 20 µm. The SGV module head assembly is controllable to write data to a tape using the write transducer of each pair and read verify the data using the read transducer of each pair.

In another embodiment, a tape head comprises a first SGV module head assembly comprising: a plurality of first write transducers disposed in a first row on a first substrate, each first write transducer of the plurality of first write transducers having a first center axis, and a plurality of first read transducers disposed in a second row adjacent to the first row on the first substrate, each first read transducer of the plurality of first read transducers having a second center axis aligned with the first center axis of an adjacent first write transducer of the plurality of first write transducers. The first SGV module head assembly is controllable to write data to a tape using the plurality of first write transducers and read verify the data using the plurality of first read transducers for a first direction of tape motion.

In yet another embodiment, a tape head comprises a first SGV module head assembly comprising: a plurality of first write transducer and first read transducer pairs. The first write transducer and the first read transducer of each pair are spaced a first distance in a first direction of about 5 µm to about 20 µm. The first SGV module head assembly is controllable to write data to a tape using the first write transducer of each pair and read verify the data using the first read transducer of each pair as the tape moves in the first direction. The tape head further comprises a second SGV module head assembly disposed adjacent to the first SGV module head assembly, the first SGV module head assembly and the second SGV module head assembly being disposed in a face-to-face arrangement. The second SGV module head assembly comprises: a plurality of second write transducer and second read transducer pairs. The second write transducer and the second read transducer of each pair are spaced a second distance in the first direction of about 5 µm to about 20 µm. The second SGV module head assembly is controllable to write data to a tape using the second write transducer of each pair and read verify the data using the second read transducer of each pair as the tape moves in a second direction opposite the first direction.

In another embodiment, a tape drive comprises a tape head comprising a first SGV module head assembly, the first SGV module head assembly comprising: a plurality of first write transducer and first read transducer pairs disposed on a first substrate, the first write transducer and the first read transducer of each first write transducer and first read transducer pair being spaced a first distance in a first direction of about 5 µm to about 20 µm, such that the first SGV module head assembly is controllable to write data to a tape using the first write transducer of each first write transducer and first read transducer pair and read and verify the data using the first read transducer of each first write transducer and first read transducer pair. The tape drive is configured to dynamically tilt the first SGV module in a second direction and a third direction opposite to the second direction.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape head and a tape head drive including a tape head. The tape head comprises at least one same gap verify (SGV) module comprising a closure, a substrate, and a plurality of write transducer and read transducer pairs. The write transducer and the read transducer of each pair are spaced a first distance in a first direction of about 5 µm to about 20 µm. The SGV module head assembly is configured to write data to a tape using the write transducer of each pair and read verify the data written on the tape using the read transducer of each pair such that the write transducer and read transducer of each pair are concurrently operable. In some embodiments, the SGV module head assembly is further configured for dynamic tilting to enable correcting of misregistration caused by tape lateral dimension changes.

Figure 1A:
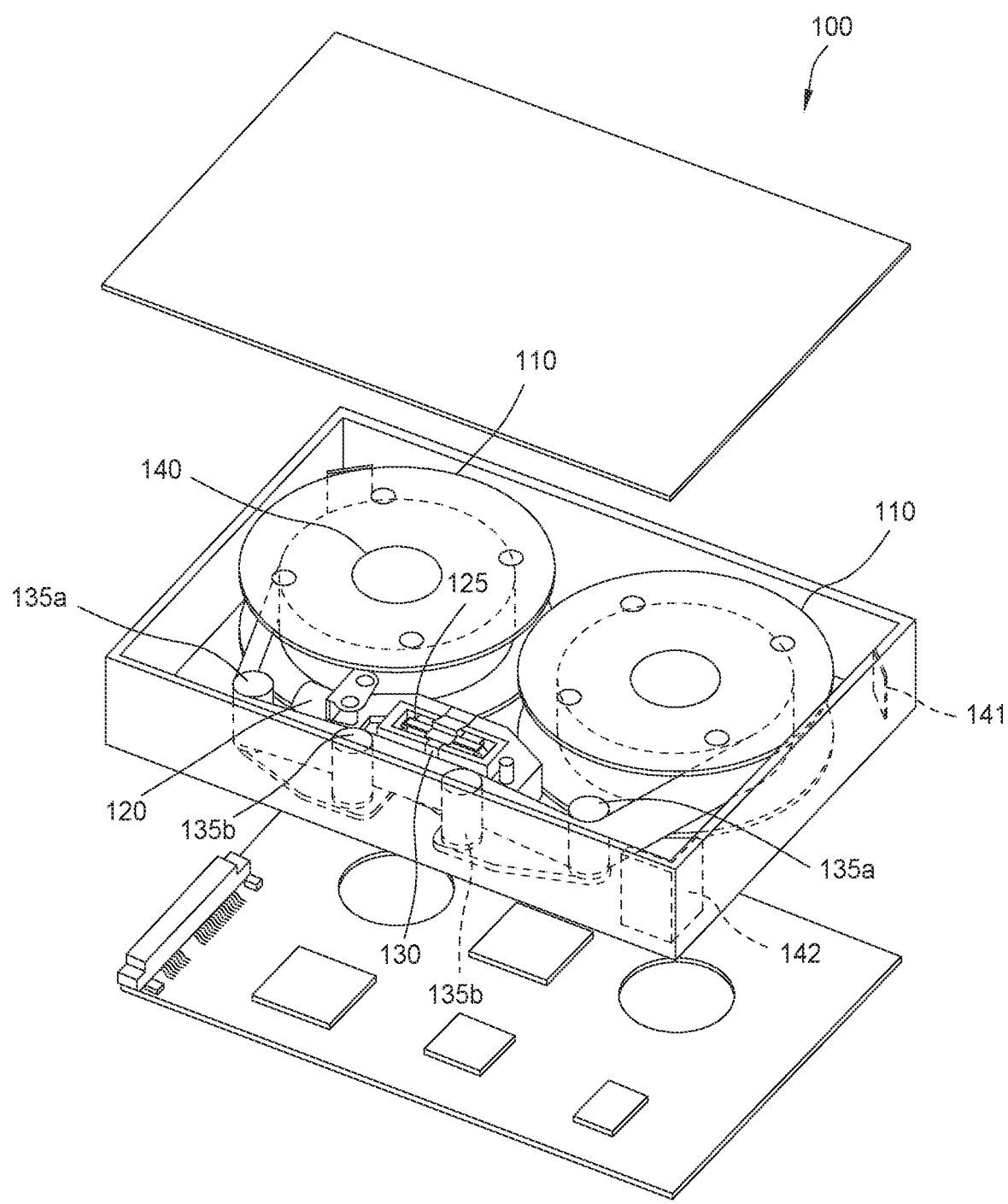
FIGS. 1A-1C illustrate a perspective exploded view, a simplified top down, and side profile view of a tape embedded drive, in accordance with some embodiments.
Figure 1B:
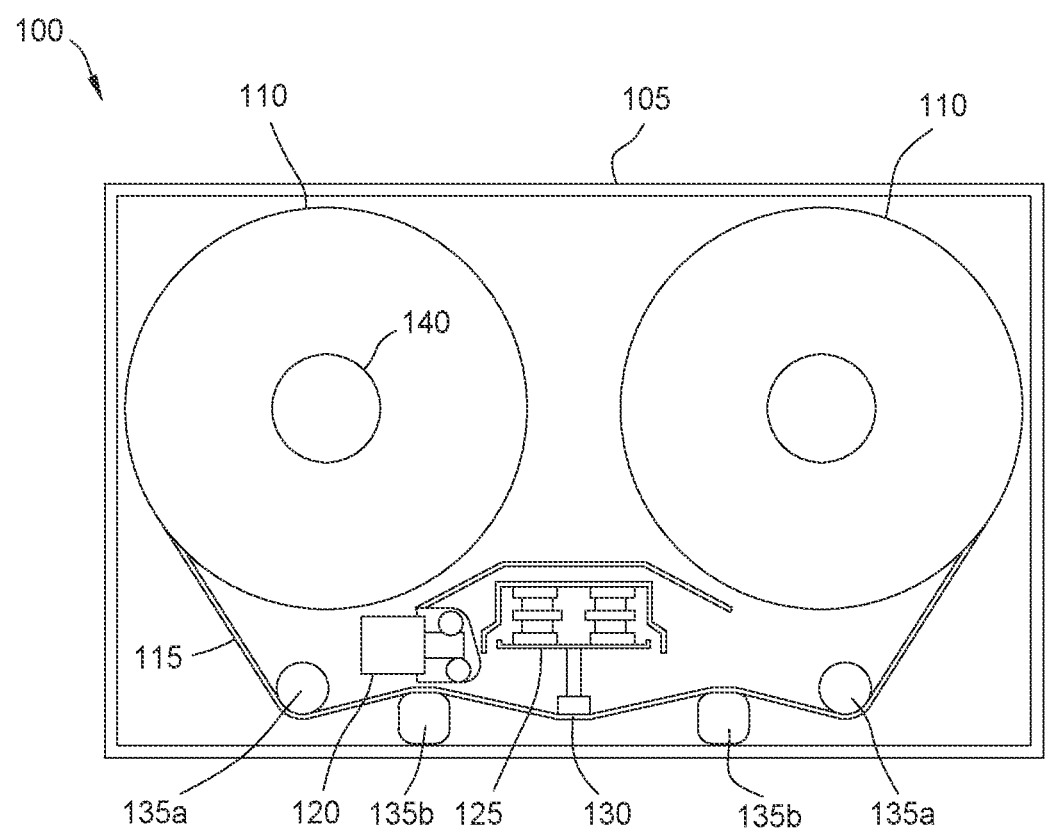
Figure 1C:
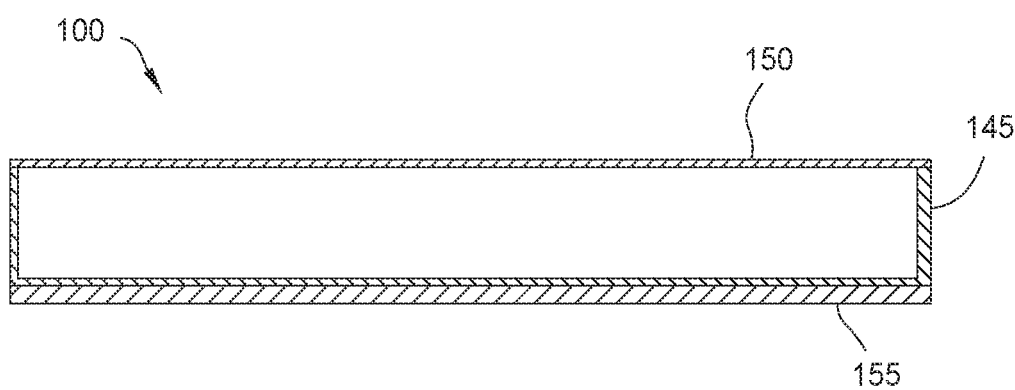

FIGS. 1A-1C illustrate a perspective exploded view, a simplified top down, and side profile view of a tape embedded drive (TED) 100, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape embedded drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape embedded drive 100. In such embodiments, the tape embedded drive 100 may no longer be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape embedded drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
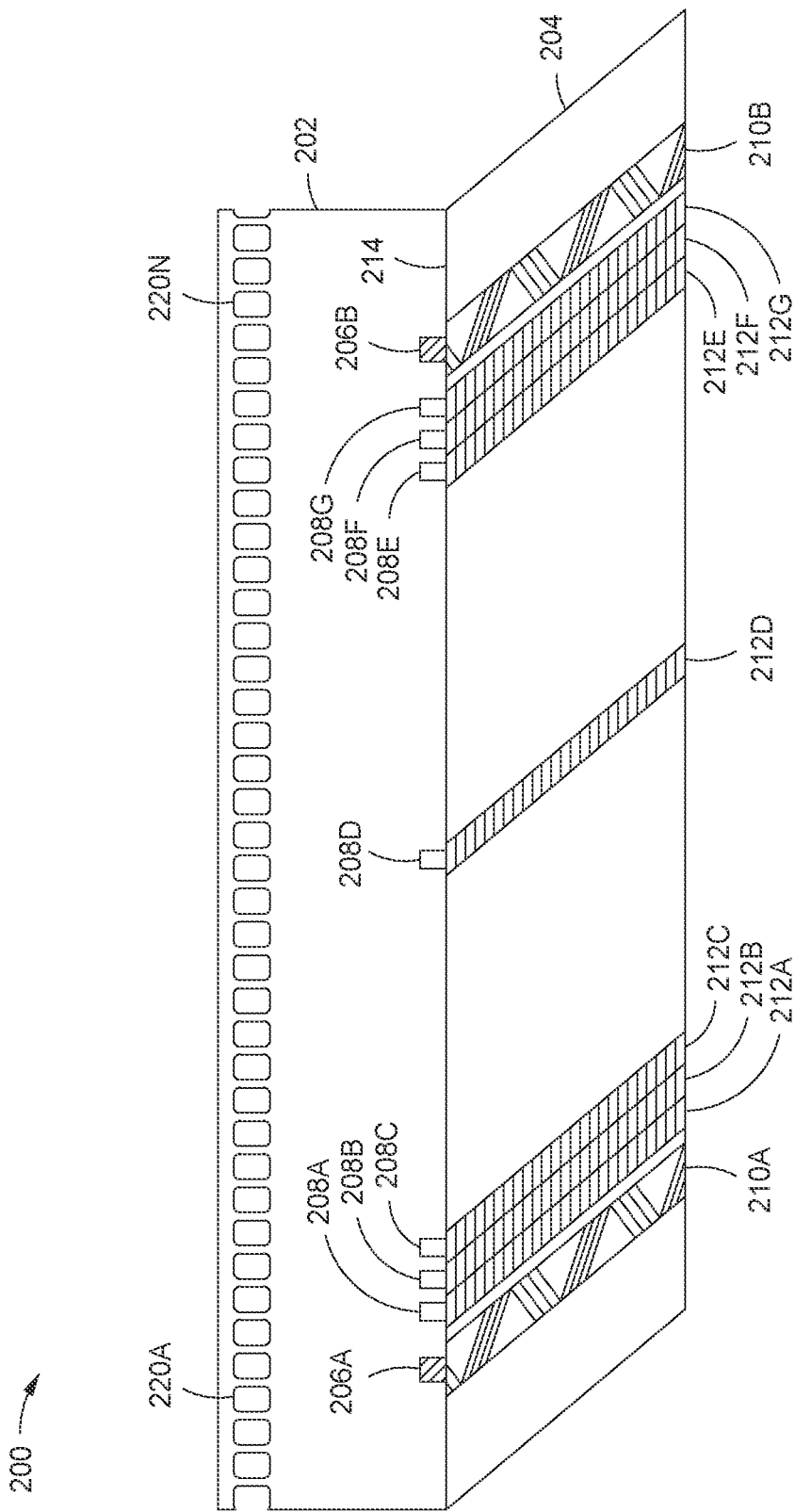
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
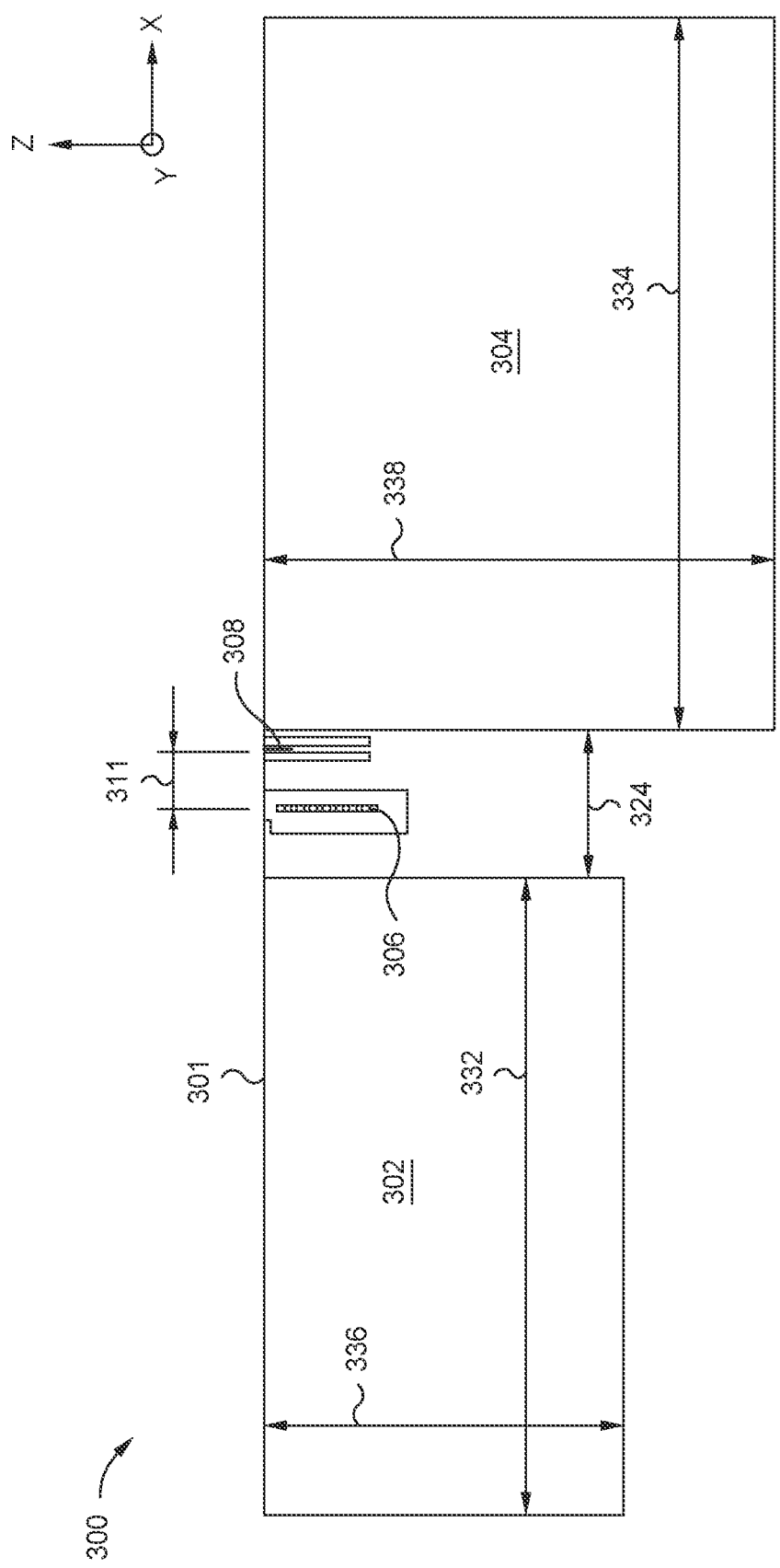
FIGS. 3A-3B illustrate a tape head comprising a same gap verify (SGV) module head assembly, according to one embodiment.
Figure 3B:
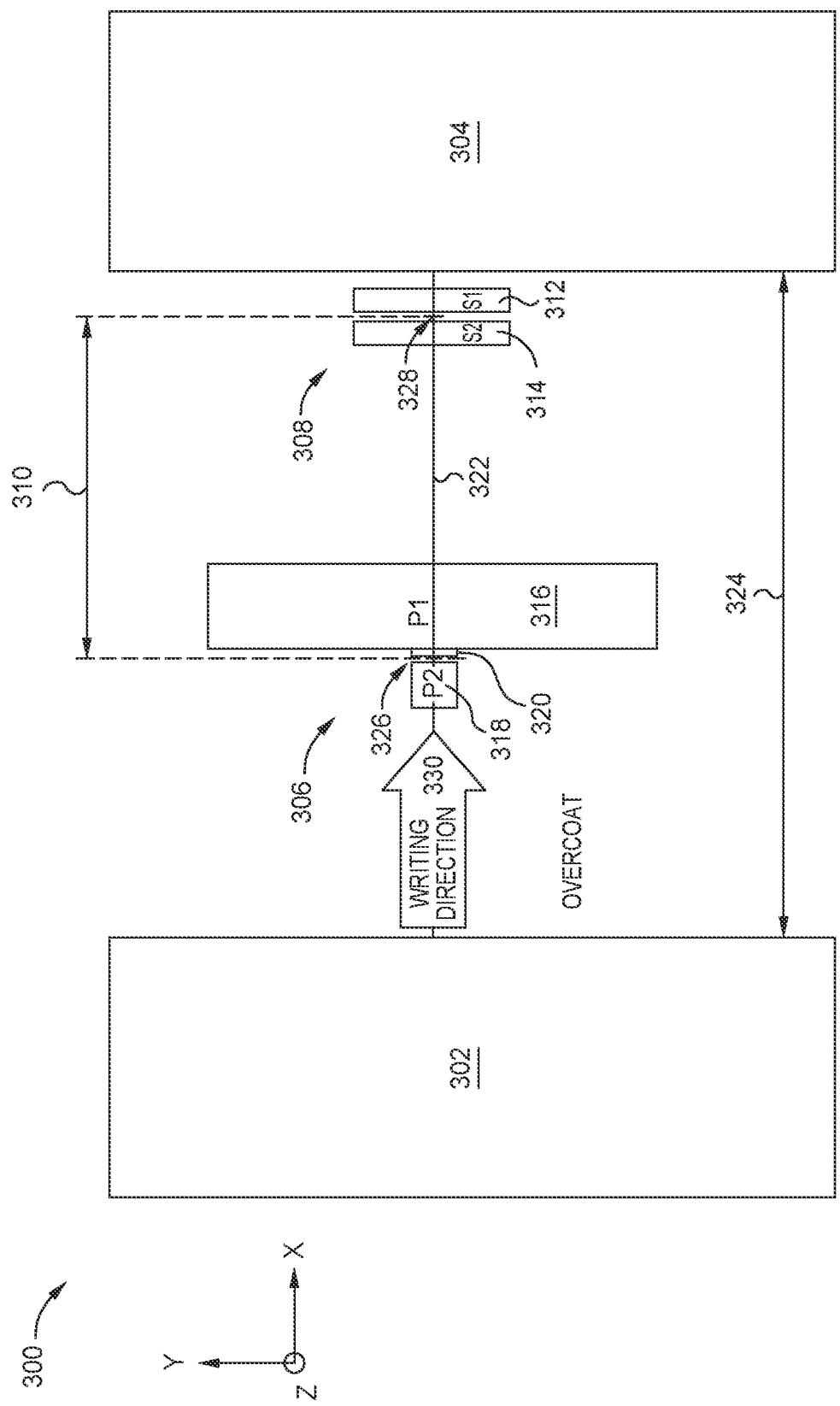

FIGS. 3A-3B illustrate a same gap verify (SGV) module head assembly 300, according to one embodiment. FIG. 3A illustrates a side-view of the SGV module head assembly 300, and FIG. 3B illustrates a media facing surface (MFS) view of the SGV module head assembly 300. The SGV module head assembly 300 may be utilized within a tape drive comprising a controller, such as the TED 100 of FIG. 1A. The SGV module head assembly 300 may be referred to as a SGV module 300. The SGV module head assembly 300 may be the tape head module 200 of FIG. 2.

The SGV module 300 comprises a closure 302, one or more write transducers 306 disposed adjacent to the closure 302, one or more read transducers 308 disposed adjacent to the one or more write transducers 306, and a substrate 304 disposed adjacent to the one or more read transducers 308. Each of the one or more write transducers 306 and the one or more read transducers 308 are disposed on the substrate 304. As shown in FIG. 3A, the SGV module 300 has a MFS 301 for facing a tape or other magnetic media, such as the tape 204 of FIG. 2. The write transducer(s) 306 may be referred to as a writer(s) 306, and the read transducer(s) 308 may be referred to as a reader(s) 308.

While only one writer 306 and one reader 308 pair is shown in FIGS. 3A-3B, the SGV module 300 may comprise a plurality of writer 306 and reader 308 pairs, which may be referred to as a head array. For example, in some embodiments, the SGV module 300 comprises a head array of 16 writers 306 and 16 readers 308, forming 16 writer 306 and reader 308 pairs, along with one or more servo readers (not shown). FIGS. 4B-4C and 5C-5F illustrate such embodiments. However, one writer 306 and one reader 308 pair is shown in FIGS. 3A-3B for clarity purposes to illustrate the alignment and spacing between each of the writer 306 and reader 308 pairs, as discussed below.

A writer 306 is spaced a distance 311 from a reader 308 of about 5 µm to about 20 µm, such as about 5 µm to about 15 µm. In embodiments comprising a plurality of writer 306 and a plurality of reader 308 pairs, each writer 306 is spaced the distance 311 from an adjacent paired reader 308. The closure 302 is spaced a distance 324 from the substrate 304 of about 20 µm to about 100 µm. The closure 302 has a width 332 in the x-direction of about 80 µm to about 150 µm, such as about 100 µm, and the substrate 304 has a width 334 in the x-direction of about 80 µm to about 150 µm, such as about 100 µm. Furthermore, the closure 302 has a length 336 in the z-direction less than a length 338 of the substrate 304 in the z-direction.

As shown in FIG. 3B, each of the writers 306 comprises a first write pole P1 316 and a second write pole P2 318. A notch 320 is disposed on the P1 316. The notch 320 is disposed adjacent to a write gap 326, where the P1 316 is spaced from the P2 318 by a distance in the x-direction at least twice the length of the write gap 326. Each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example. The write gap 326 and the magnetic sensor 328 are aligned or centered upon a center axis 322 in the y-direction such that the center axis 322 is aligned with a centerline of the write gap 326 and a centerline of the magnetic sensor 328. While the reader 308 is spaced a distance 311 from the writer 306, more specifically, the write gap 326 is spaced a distance 310 from the magnetic sensor 328. The distance 310 is between about 5 µm to about 20 µm, such as about 8 µm to about 15 µm. In some embodiments, the distance 310 is measured from the write gap 326 to an MgO layer (not shown) of the magnetic sensor 328.

When writing data to a tape or other media, the tape moves over the writer 306 in the writing direction 330 (e.g., in the x-direction). Due at least in part to the distance 310 between the write gap 326 and the magnetic sensor 328 of a writer 306 and reader 308 pair, the writer 306 is able to write to the media, and the reader 308 is able to read the data to verify the data was written correctly. A magnetic shield (not shown) may be used to further reduce magnetic crosstalk between the writer 306 and the reader 308, as well as reader shields and coil design optimizations. Thus, the writer 306 is able to write data to a portion of the tape, and the paired reader 308 is able to read verify the newly written portion of the tape immediately. As such, the SGV module head assembly 300 is able to write data to and read verify data from a tape concurrently.

The SGV module 300 is able to concurrently write and read data due in part to the separation distance 310 between the write gap 326 and the magnetic sensor 328 of a writer 306 and reader 308 pair. The write gap 326 and magnetic sensor 328 are spaced far enough apart that the amplitude of signals in the reader 308 that arise from coupling of magnetic flux from the paired writer 306 is reduced or substantially less than the readback signal of the reader 308 itself. By spacing the writer 306 from the reader 308 by the distance 311 or the distance 310, and by adjusting magnetic design parameters, such as magnetic shield dimensions, write transducer coil design, and optionally deploying additional shielding between the read and write transducers 308, 306, a ratio of read signal to coupled writer signal amplitudes greater than about 30 dB may be achieved.

As used herein, the SGV module 300 being able to "concurrently" write and read data refers to the fact that both the writer 306 and the reader 308 are concurrently turned "on" or able to operate simultaneously with respect to various data written to a tape. However, it is to be noted that the writer 306 and the reader 308 are not "concurrently" operating on the same data at the same time. Rather, the writer 306 first writes data, and as the tape moves over the reader 308, the reader 308 is then able to read verify the newly written data as the writer 306 concurrently writes different data to a different portion of the tape. Furthermore, it is to be noted that a controller (not shown) is configured to operate the SGV module 300, and as such, the controller is configured to independently operate both the writer 306 and the reader 308. Thus, while the writer 306 is described as writing data and the reader 308 is described as reading the data, the controller enables the writer 306 to write and enables the reader 308 to read.

Figure 4A:
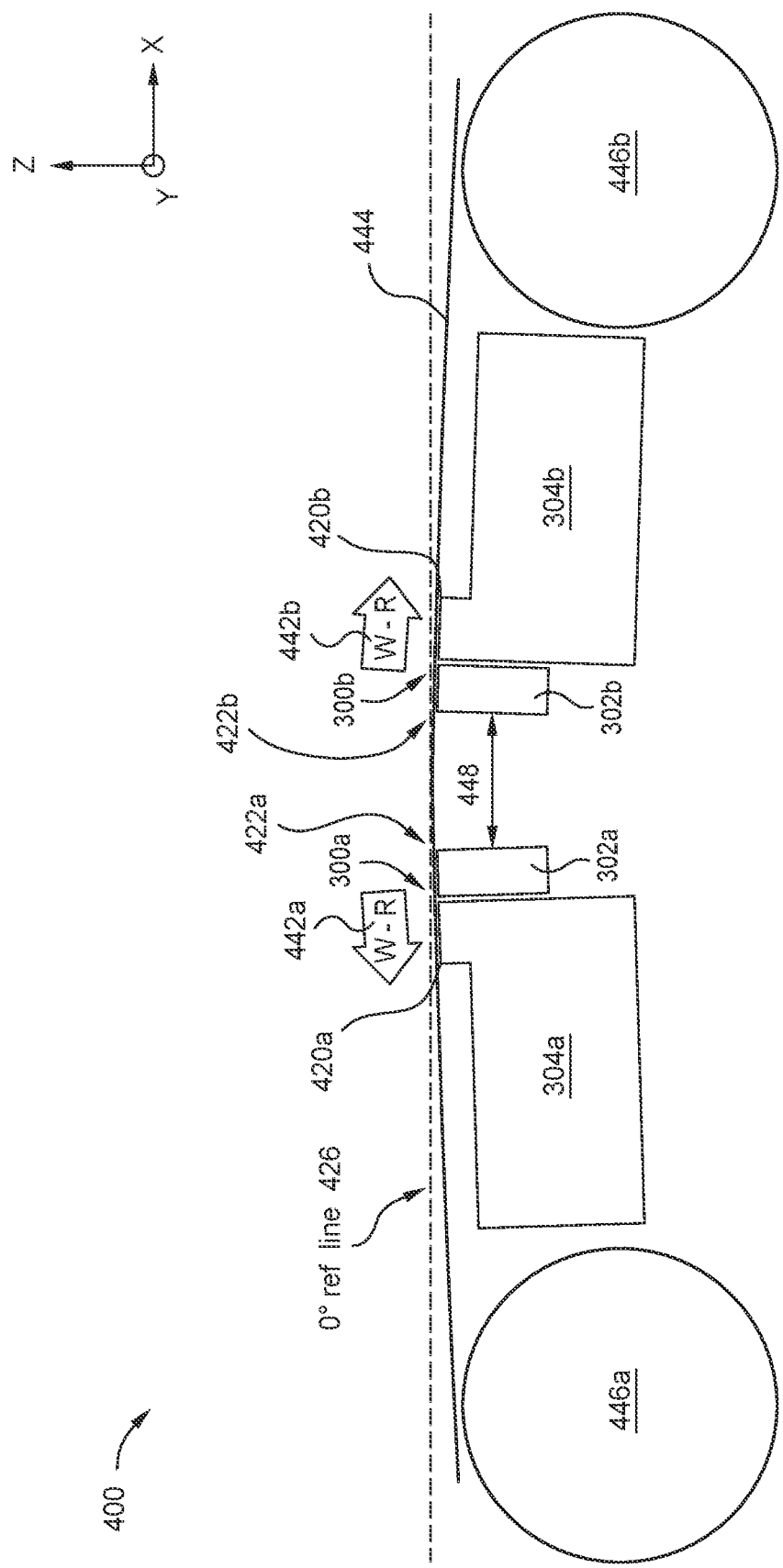
FIGS. 4A-4C illustrate a tape head comprising two SGV module head assemblies, according to various embodiment.
Figure 4B:
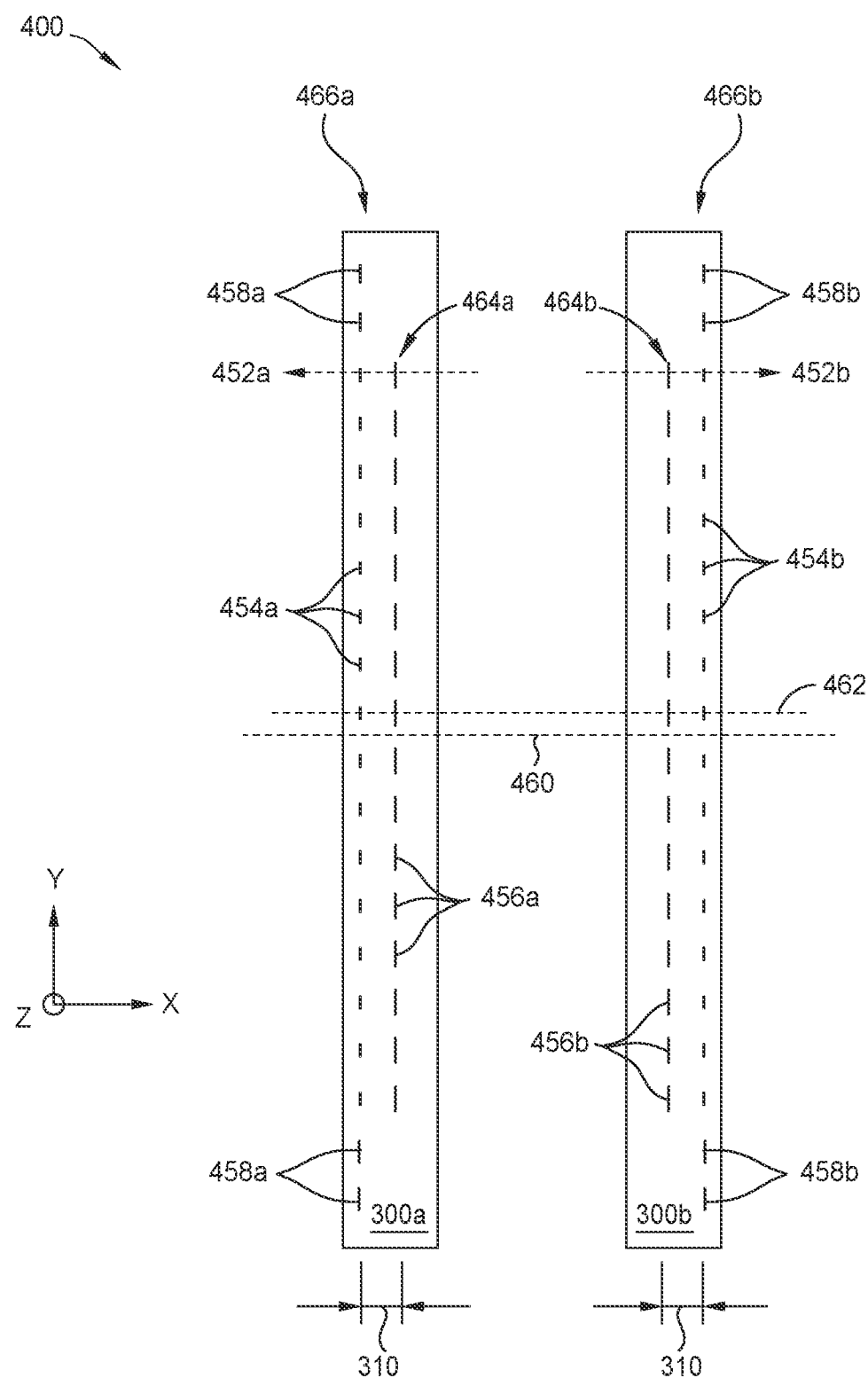

FIG. 4A illustrates a side view of a tape head 400 comprising two SGV module head assemblies 300a, 300b, according to one embodiment. FIG. 4B illustrates an MFS view of the tape head 400 comprising two SGV module head assemblies 300a, 300b, according to one embodiment. FIG.

4C illustrates an MFS view of the tape head 400 comprising two SGV module head assemblies 300a, 300b in a tilted and offset formation, according to another embodiment. The tape head 400 may be the tape head 200 of FIG. 2. The tape head 400 comprises a first SGV module head assembly 300a and a second SGV module head assembly 300b. The first SGV module head assembly 300a may be referred to as a first SGV module 300a, and the second SGV module head assembly 300b may be referred to as a second SGV module 300b. Each of the first and second SGV modules 300a, 300b may be the SGV module 300 of FIGS. 3A-3B.

The first SGV module 300a comprises a first closure 302a, one or more first writers 456a (shown in FIGS. 4B-4C) disposed adjacent to the first closure 302a, one or more first readers 454a (shown in FIGS. 4B-4C) disposed adjacent to the one or more first writers 456a, and a first substrate 304a disposed adjacent to the one or more first readers 454a. Each of the one or more first writers 456a and the one or more first readers 454a are disposed on the first substrate 304a. Similarly, the second SGV module 300b comprises a second closure 302b, one or more second writers 456b (shown in FIGS. 4B-4C) disposed adjacent to the second closure 302b, one or more second readers 454b (shown in FIGS. 4B-4C) disposed adjacent to the one or more second writers 456b, and a second substrate 304b disposed adjacent to the one or more second readers 454b. Each of the one or more second writers 456b and the one or more second readers 454b are disposed on the second substrate 304b. The one or more first and second writers 456a, 456b may each be the writer 306 of FIGS. 3A-3B, and the one or more first and second readers 454a, 454b may each be the reader 308 of FIGS. 3A-3B.

In one embodiment, the first SGV module 300a and the second SGV module 300b are arranged in a face-to-face configuration or arrangement such that the first closure 302a of the first SGV module 300a is disposed adjacent to the second closure 302b of the second SGV module 300b. In other words, the first SGV module 300a is a mirror image of the second SGV module 300b, as further shown in FIG. 4B, where the second SGV module 300b is a right hand module like that shown in FIGS. 3A-3B and the first SGV module 300a is a left hand module. The first SGV module 300a has a first writing and reading direction 442a that is opposite to a second writing and reading direction 442b of the second SGV module 300b. The first SGV module 300a is spaced a distance 448 from the second SGV module 300b of about 500 µm to about 1000 µm.

A MFS of each of the first and second SGV modules 300a, 300b is configured to support a tape 444 or other magnetic media. The tape 444 is configured to move over the first and second SGV modules 300a, 300b using a first guide 446a and a second guide 446b in both the x-direction and the −x-direction. The tape 444 may wrap around a first substrate corner 420a and a first closure corner 422a of the first SGV module 300a, and around a second closure corner 422b and a second substrate corner 420b of the second SGV module 300b, resulting in the tape being bent or angled downwards from a 0° reference line 426 (e.g., parallel to the x-axis) towards the guides 446a, 446b. The wrapping of the tape 444 at the first and second closure corners 422a, 422b may individually cause the tape 444 to be angled or offset from the 0° reference line 426 by about 2.0°±0.2°. Similarly, the wrapping of the tape 444 at the first and second substrate corners 420a, 420b may individually cause the tape 444 to be angled or offset from the 0° reference line 426 by about 2.0°±0.2°.

As shown in FIG. 4B, each of the first writers 456a is accurately aligned and paired with a first reader 454a in the x-direction (shown in arrow 452a pointing through a center of a first writer 456a and a center of a first reader 454a), and each of the second writers 456b is accurately aligned and paired with a second reader 454b in the x-direction (shown in arrow 452b pointing through a center of a second writer 456b and a center of a second reader 454b). Like the SGV module 300 of FIGS. 3A-3B, the readers 454a of the first SGV module 300a are spaced a distance of about 5 µm to about 20 µm from the respective paired writers 456a of the first SGV module 300a, and the readers 454b of the second SGV module 300b are spaced a distance of about 5 µm to about 20 µm from the respective paired writers 456b of the second SGV module 300b.

As such, the first SGV module 300a and the second SGV module 300b are both able to independent write and read verify data. For example, a first writer 456a of the first SGV module 300a is able to write data to a portion of the tape, and an aligned or paired first reader 454a of the first SGV module 300a is able to read verify the newly written portion of the tape immediately. Similarly, a second writer 456b of the second SGV module 300b is able to write data to a portion of the tape, and an aligned or paired second reader 454b of the second SGV module 300b is able to read verify the newly written portion of the tape immediately. As such, the first SGV module head assembly 300a is able to write data to and read verify data from a tape concurrently, and the second SGV module 300b is able to write data to and read verify data from a tape concurrently as well.

Figure 4C:
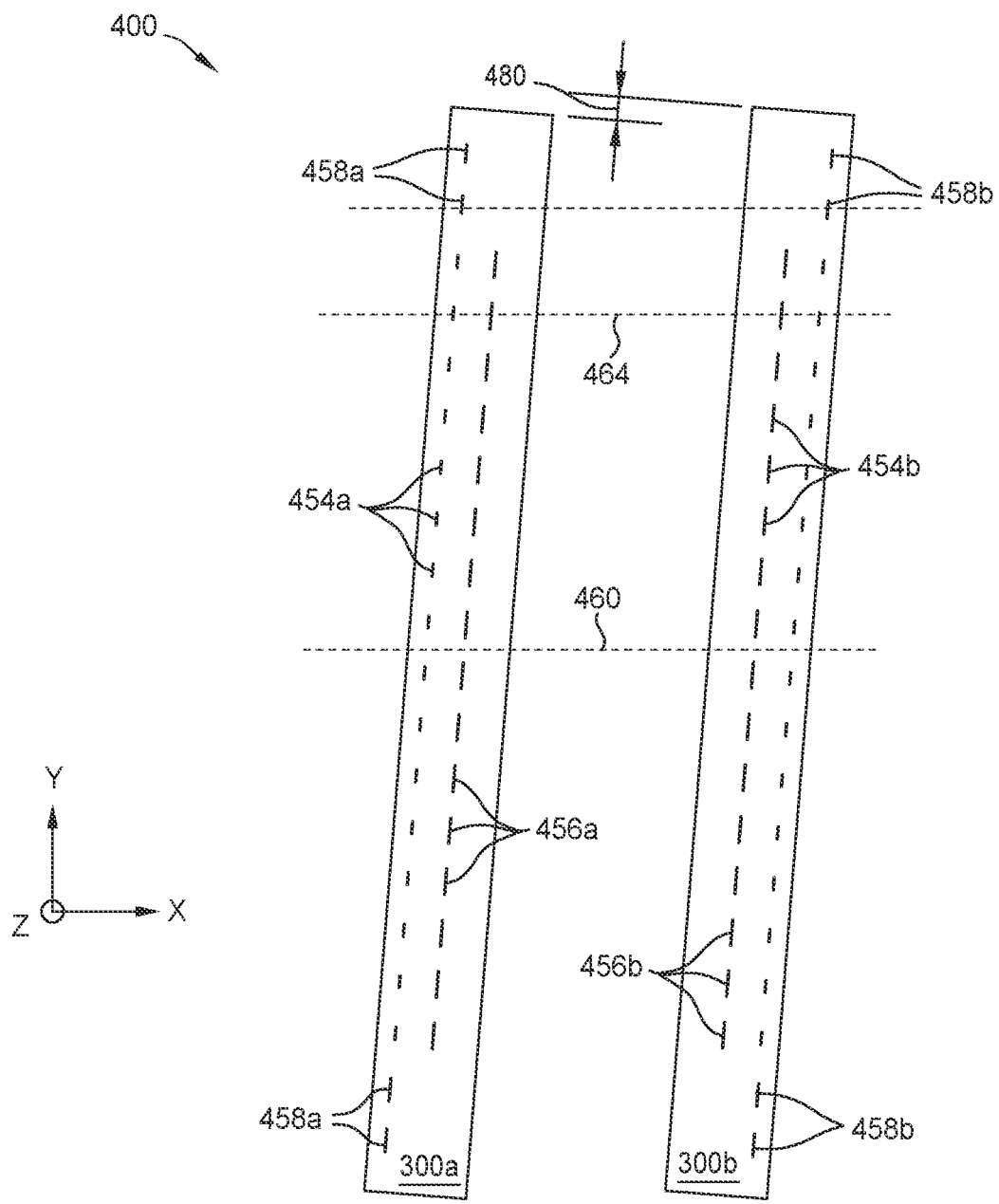

As shown in FIGS. 4B-4C, the first SGV module head assembly 300a comprises four (4) first servo readers 458a, 16 first writers 456a, and 16 first readers 454a, forming 16 first writer 456a and first reader 454a pairs, where each of the first writers 456a is spaced the distance 310 from each of the first readers 454a. Each first writer 456a is paired with an aligned and adjacent first reader 454a in the x-direction. The first writers 456a are disposed in a first row or column 464a in the y-direction, and the first readers 454a are disposed in a second row or column 466a in the y-direction adjacent to the row of first writers 456a. The first servo readers 458a are disposed at the ends of the second row or column 466a.

Similarly, the second SGV module head assembly 300b comprises four (4) second servo readers 458b, 16 second writers 456ba, and 16 second readers 454b, forming 16 second writer 456b and second reader 454b pairs, where each of the second writers 456b is spaced the distance 310 from each of the second readers 454b. Each second writer 456b is paired with an aligned and adjacent second reader 454b in the x-direction. The second writers 456b are disposed in a first row or column 464b in the y-direction, and the second readers 454b are disposed in a second row or column 466b in the y-direction adjacent to the row of second writers 456b. The second servo readers 458b are disposed at the ends of the second row or column 466b. While four servo readers 458a, 458b are shown within each SGV module 300a, 300b, the SGV modules 300a, 300b may each individually comprise two servo readers 458a, 458b, four servo readers 458a, 458b, or more.

In FIG. 4B, the first SGV module head assembly 300a simultaneously writes and read verifies when the tape 444 moves in a first direction indicated by arrow 452a, and the second SGV module head assembly 300b simultaneously writes and read verifies when the tape 444 moves in a second direction indicated by arrow 452b. The first direction indicated by arrow 452a may be a reverse direction of the tape and the second direction indicated by arrow 452b may be a forward direction of the tape. A first writer 456a writes data while a paired first reader 454a aligned with the first writer 456a in the x-direction reads the written data, and a second writer 456b writes data while a paired second reader 454b aligned with the second writer 456b in the x-direction reads the written data.

Moreover, the first and second SGV modules 300a, 300b are able to read verify one another's data as well when the tracks of the SGV modules 300a, 300b are accurately aligned in the x, y, and z-directions. As further shown in FIG. 4B, the first and second SGV modules 300a, 300b are both centrally aligned on the axis 460 such that a paired first writer 456a and a first reader 454a are aligned in the x-direction with a paired second writer 456b and a second reader 456b, as shown by line 462. In other words, each of the first servo readers 458a, the first writers 456a, and the first readers 454a is accurately aligned in the x-direction with each of the second servo readers 458b, the second writers 456b, and the second readers 454b. As such, the first SGV module 300a may write data to a tape, and the second SGV module 300b can read verify the data written by the first SGV module 300a, and vice versa.

FIG. 4C is similar to FIG. 4B; however, the first SGV module 300a is offset from the second SGV module 300b a distance 480 in the y-direction to correspond to a desired final nominal tilt angle. Furthermore, both the first and second SGV modules 300a, 300b are statically tilted in the xy-direction about 1° to about 12°, such as about 6°, from the centerline 460 to allow each of the first writers 456a to be accurately aligned in the x-direction with respective each of the second readers 454b, or conversely, to allow each of the first readers 454a to be accurately aligned in the x-direction with respective each of the second writers 456b, as demonstrated by line 464. The first and second SGV modules 300a, 300b are placed in the tape drive at the nominal tilted angle, and the tape drive, or a controller of the tape drive, is configured to make small dynamic changes to the tilt angle of the first and second SGV modules 300a, 300b independently. Tilting the first and second SGV modules 300a, 300b enables correction of mis-registration caused by tape lateral dimensional changes.

By offsetting the first and second SGV modules 300a, 300b from one another in the y-direction, and by tilting both the first and second SGV modules 300a, 300b, like shown in FIG. 4C, the first and second SGV modules 300a, 300b are able to read verify one another's data as well when the tracks of the SGV modules 300a, 300b are accurately aligned in the x, y, and z-directions. As such, the first SGV module 300a may write data to a tape, and the second SGV module 300b can read verify the data written by the first SGV module 300a, and vice versa.

Figure 5A:
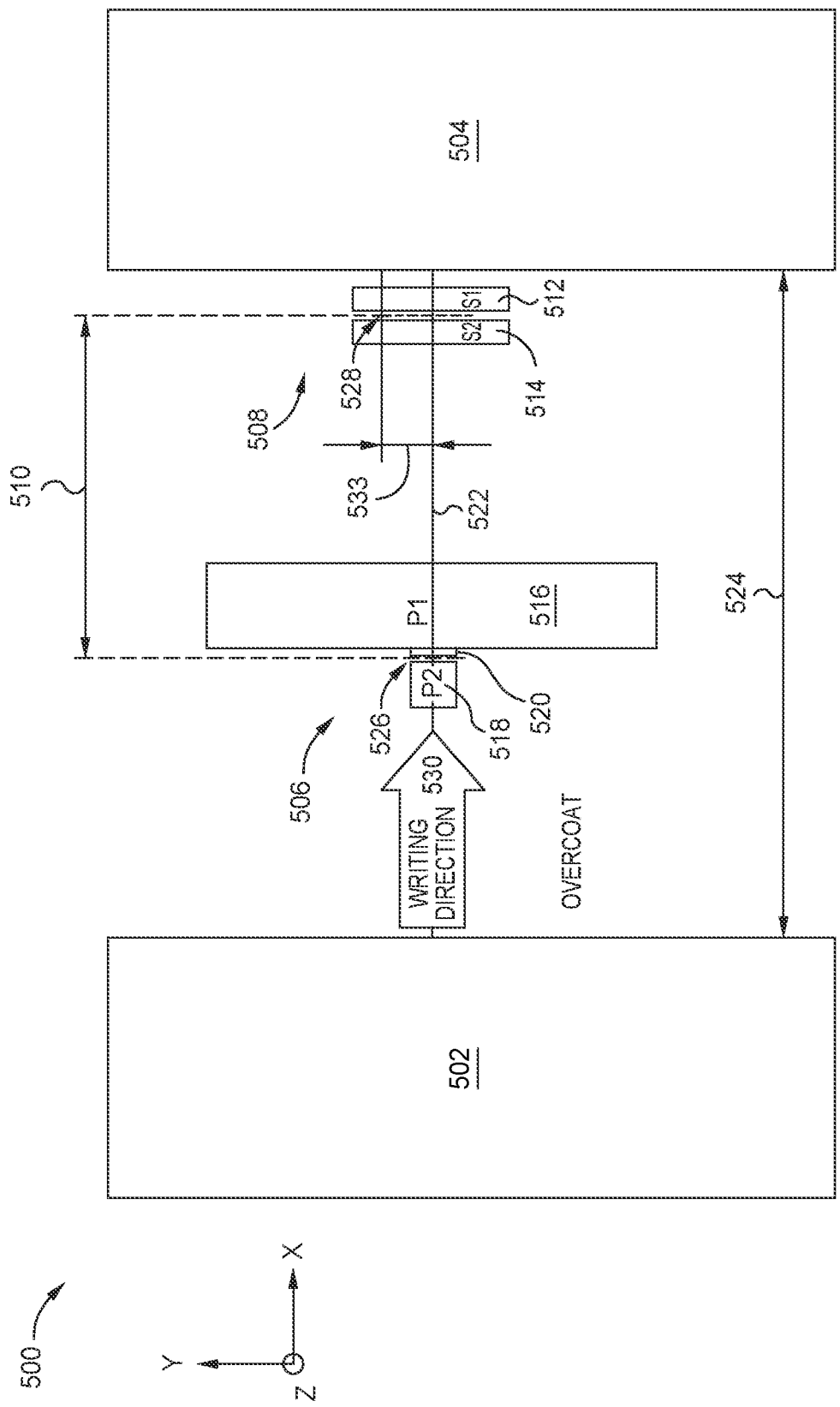
FIG. 5A illustrates a MFS view of a tape head comprising a SGV module head assembly configured to dynamically tilt, according to another embodiment.
Figure 5B:
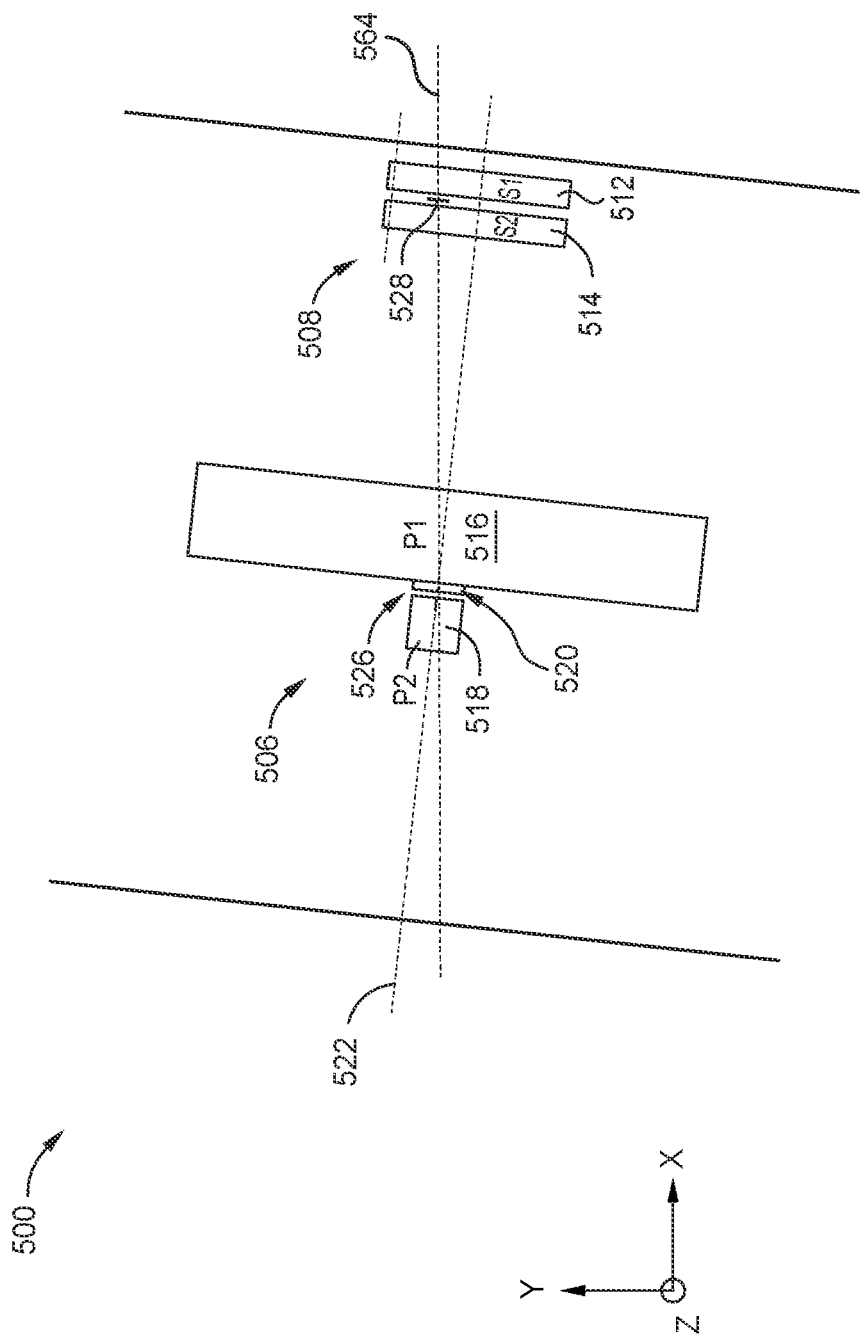
FIG. 5B illustrates a MFS view of the SGV module head assembly of FIG. 5A in a tilted configuration, according to one embodiment.

FIG. 5A illustrates a MFS view of a SGV module head assembly 500 configured for dynamic tilting, according to another embodiment. FIG. 5B illustrates a MFS view of the SGV module head assembly 500 in a tilted configuration, according to one embodiment. The SGV module head assembly 500 may be utilized within a tape drive comprising a controller, such as the TED 100 of FIG. 1A. The SGV module head assembly 500 may be referred to as the SGV module 500. The SGV module head assembly 500 may be the tape head module 200 of FIG. 2.

While only one SGV module head assembly 500 is shown in FIG. 5A, a tape head may comprise two SGV module head assemblies 500, like shown and described in FIGS. 4A-4C and FIGS. 5C-5F, where a second SGV module head assembly is disposed adjacent to and a mirror image of the SGV module head assembly 500. FIGS. 5C-5F illustrate MFS views of a tape head comprising first and second SGV module head assemblies 500 of FIGS. 5A-5B.

The SGV module 500 comprises a closure 502, one or more write transducers 506 disposed adjacent to the closure 502, one or more read transducers 508 disposed adjacent to the one or more write transducers 506, and a substrate 504 disposed adjacent to the one or more read transducers 308. Each of the one or more write transducers 506 and the one or more read transducers 508 are disposed on the substrate 504. The write transducer(s) 506 may be referred to as a writer(s) 506, and the read transducer(s) 508 may be referred to as a reader(s) 508. The closure 502 is spaced a distance 524 in the x-direction from the substrate 504 of about 20 µm to about 100 µm. The closure 502 may be the closure 302 of FIGS. 3A-3B, and the substrate 504 may be the substrate 304 of FIGS. 3A-3B. As such, the closure 502 and the substrate 504 may have the same height, width, and length as the closure 302 and the substrate 304 discussed above, respectively.

While only one writer 506 and one reader 508 pair is shown in FIGS. 5A-5B, the SGV module 500 may comprise a plurality of writer 506 and reader 508 pairs, which may be referred to as a head array. For example, in some embodiments, the SGV module 500 comprises a head array of 16 writers 506 and 16 readers 508, forming 16 writer 506 and reader 508 pairs, along with one or more servo readers 548a, 548b (shown in FIGS. 5C-5F). FIGS. 4B and 5C-5F illustrate such embodiments. However, one writer 506 and one reader 508 pair is shown for clarity purposes in FIGS. 5A-5B to illustrate the alignment and spacing between each of the writer 506 and the reader 508 pairs, as discussed below.

Each of the writers 506 comprises a first write pole P1 516 and a second write pole P2 518. A notch 520 is disposed on the P1 516. The notch 520 is disposed adjacent to a write gap 526, where the P1 516 is spaced from the P2 518 by a distance in the x-direction at least twice the length of the write gap 526. Each of the readers 508 comprises a first shield S1 512, a second shield S2 514, and a magnetic sensor 528 disposed between the S1 512 and the S2 514. The magnetic sensor 528 may be a TMR sensor, for example. The write gap 526 is spaced a distance 510 from the magnetic sensor 528. The distance 510 is between about 5 µm to about 20 µm, such as about 5 µm to about 15 µm. In some embodiments, the distance 510 is measured from the write gap 526 to an MgO layer (not shown) of the magnetic sensor 528.

In the un-tilted configuration of FIG. 5A, the magnetic sensor 528 is offset or unaligned from the paired write gap 526 in the y-direction. A centerline 522 of the write gap 526 is offset a distance 533 from a centerline of the magnetic sensor 528, or vice versa. The distance 533 is between about 200 nm to about 2000 nm, such as about 1250 nm, and is chosen to give proper alignment when the SGV module 500 is statically rotated. While the magnetic sensor 528 is described herein as being offset from the paired write gap 526 by the distance 533, the write gap 526 may instead be offset from the paired magnetic sensor 528 by the distance 533. As such, the write gap 526 may be offset or unaligned from the paired magnetic gap 528 in the −y-direction.

The magnetic sensor 528 of the reader 508 is offset the distance 533 from the centerline 522 of the write gap 526 of the paired writer 506 to enable the SGV module 500 to tilt, as shown in FIG. 5B. In one embodiment, the tape drive is configured to dynamically tilt the SGV module 500 in order to write to and read data from a tape or other magnetic media. The SGV module 500 is statically tilted in the xy-direction about 1° to about 12°, such as about 6°, from the centerline 522 to allow the reader 508 to align with the writer 506, as demonstrated by line 564. The SGV module 500 is then placed in the tape drive at the nominal tilted angle, and the tape drive, or a controller of the tape drive, is configured to make small dynamic changes to the tilt angle of the SGV module 500. For example, the SGV module 500 may tilt to accurately read data from a tape that has been distorted or stretched. Tilting the SGV module 500 enables correction of mis-registration caused by tape lateral dimensional changes.

When writing data to a tape or other media, the tape moves over the writer 506 in the writing direction 530 (e.g., in the x-direction). When the SGV module 500 is tilted, the writer 506 and the reader 508 are aligned, as shown by line 564, and the writer 506 is able to write to the media while the paired reader 508 is able to read the data to verify the data was written correctly. Thus, the writer 506 is able to write data to a portion of the tape, and the paired reader 508 is able to read verify the newly written portion of the tape immediately. As such, the SGV module head assembly 500 is able to write data to and read data from a tape concurrently.

The SGV module 500 is able to concurrently write and read data due in part to the distance 510 between the write gap 526 and the magnetic sensor 528. Tilting the SGV module 500 aligns the writer 506 and the reader 508 to enable read verify in the tilted embodiment. The write gap 526 and magnetic sensor 528 of a writer 506 and reader 508 pair are spaced far enough apart that the amplitude of signals in the reader 508 that arise from coupling of magnetic flux from the writer 506 is reduced or substantially less than the readback signal of the reader 508 itself. By spacing the writer 506 from the paired reader 508 by the distance 510, and by adjusting magnetic design parameters, such as magnetic shield dimensions, write transducer coil designs, and optionally deploying additional shielding between the read and write transducers 508, 506, the ratio read signal to coupled writer signal amplitudes is 30 dB or greater.

As used herein, the SGV module 500 being able to "concurrently" write and read data refers to the fact that both the writer 506 and the reader 508 are concurrently turned "on" or able to operate simultaneously with respect to various data written to a tape. However, it is to be noted that the writer 506 and the reader 508 are not "concurrently" operating on the same data at the same time. Rather, the writer 506 first writes data, and as the tape moves over the reader 508, the reader 508 is then able to read verify the newly written data as the writer 506 concurrently writes different data to a different portion of the tape. Furthermore, it is to be noted that a controller (not shown) is configured to operate the SGV module 500, and as such, the controller is configured to independently operate both the writer 506 and the reader 508. Thus, while the writer 506 is described as writing data and the reader 508 is described as reading the data, the controller enables the writer 506 to write and enables the reader 508 to read.

Figure 5D:
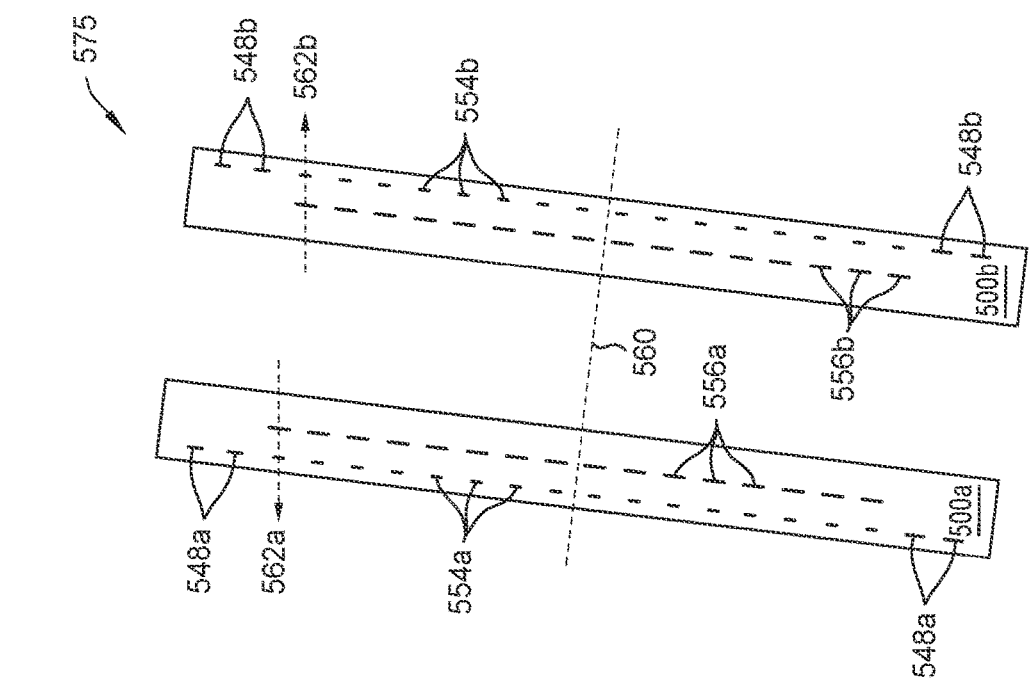
FIG. 5D illustrates a MFS view of a tape head comprising two SGV module head assemblies in a titled configuration, according to one embodiment.
Figure 5C:
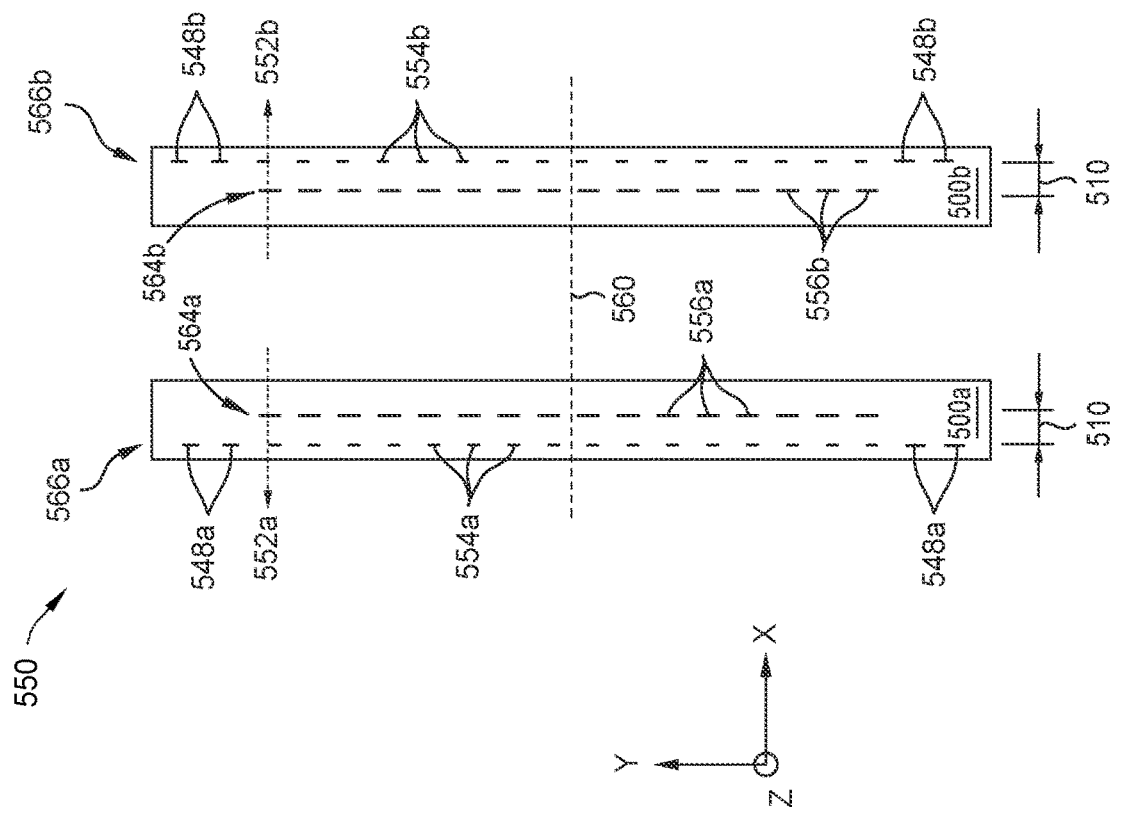
FIG. 5C illustrates a MFS view of a tape head comprising two SGV module head assemblies in an untilted configuration, according to one embodiment.

FIG. 5C illustrates a MFS view of a tape head comprising two SGV module head assemblies 500a, 500b in an untilted configuration 550, similar to FIG. 5A, and having an offset between the reader and paired writer, according to one embodiment. FIG. 5D illustrates a MFS view of a tape head comprising two SGV module head assemblies 500a, 500b in a titled configuration 575, similar to FIG. 5B, according to another embodiment. In FIGS. 5C-5D, the first readers 554a of the first SGV module 500a are aligned in the y-direction with the second readers 554b of the second SGV module 500b. Each of the first SGV module 500a and the second SGV module 500b may be the SGV module 500 of FIGS. 5A-5B.

In FIGS. 5C-5D, the first SGV module head assembly 500a comprises four (4) first servo readers 548a, 16 first writers 556a, and 16 first readers 554a, forming 16 first writer 556a and first reader 554a pairs, where each of the first writers 556a is spaced the distance 510 from respective each of the first readers 554a. Similarly, the second SGV module head assembly 500b comprises four (4) second servo readers 548b, 16 second writers 556b, and 16 second readers 554b, forming 16 second writer 556b and second reader 554b pairs, where each of the second writers 556b is spaced the distance 510 from respective each of the second readers 554b. While four servo readers 548a, 548b are shown within each SGV module 500a, 500b, the SGV modules 500a, 500b may each individually comprise two servo readers 548a, 548b, four servo readers 548a, 548b, or more.

The first and second SGV modules 500a, 500b are identical but rotated 180° with respect to one another, and are disposed in a face-to-face arrangement. The first SGV module 500a operates as a tape (not shown) moves in a first direction indicated by arrow 562a, and the second SGV module 500b operates as a tape (not shown) moves in a second direction indicated by arrow 562b. The first direction indicated by arrow 562a may be a reverse direction of the tape and the second direction indicated by arrow 562b may be a forward direction of the tape.

The first writers 556a are disposed in a first row or column 564a in the y-direction, and the first readers 554a are disposed in a second row or column 566a in the y-direction adjacent to the row of first writers 556a, as shown in FIG. 5C. The first servo readers 548a are disposed at the ends of the second row or column 566a. The second writers 556b are disposed in a first row or column 564b in the y-direction, and the second readers 554b are disposed in a second row or column 566b in the y-direction adjacent to the row of second writers 5456b. The second servo readers 548b are disposed at the ends of the second row or column 566b.

The first arrow 552a is aligned with a centerline of a first writer 556a and the second arrow 552b is aligned with a centerline of a second writer 556b, where the first and second arrows 552a, 552b are disposed parallel to a center axis 560 (i.e., the x-axis) of the first and second SGV modules 500a, 500b. As shown in FIG. 5C, the first arrow 552a is unaligned with (i.e., aligned relative to an offset) a paired first reader 554a, and the second arrow 552b is unaligned with a paired second reader 554b, as the readers 554a, 554b are unaligned with (i.e., aligned relative to an offset) their paired writers 556a, 556b, like described in FIG. 5A.

However, in the tilted configuration 575 of FIG. 5D, a third arrow 562a is aligned with both a centerline of a first writer 556a and a centerline of a first reader 554a of the first SGV module 500a. Similarly, in the second SGV module 500b, a fourth arrow 562b is aligned with both a centerline of a second writer 556b and a centerline of a second reader 554b. Thus, each of the first writers 556a is accurately aligned with a paired first reader 554a in the x-direction (shown by arrow 562a pointing through a center of a first writer 556a and a center of a first reader 554a), and each of the second writers 556b is accurately aligned with a paired second reader 554b in the x-direction (shown by arrow 562b pointing through a center of a second writer 556b and a center of a second reader 554b).

As such, in the tilted configuration 575, the first writers 556a are aligned with the first readers 554a, and the second writers 556b are aligned with the second readers 554b. Thus, the writers 556a, 556b are able to write to the media, and the paired readers 554a, 554b, respectively, are able to read the data written by the paired writer 556a, 556b to verify the data was written correctly. As such, the first and second SGV module head assemblies 500a, 500b are able to independently write data to and read verify data from a tape concurrently. However, as shown in FIG. 5D, the first writers and readers 556a, 554a of the first SGV module 500a do not align with the second writers and readers 556b, 554b of the second SGV module 500b, preventing the first SGV module 500a from read verifying data written by the second SGV module 500b, and vice versa.

Figure 5F:
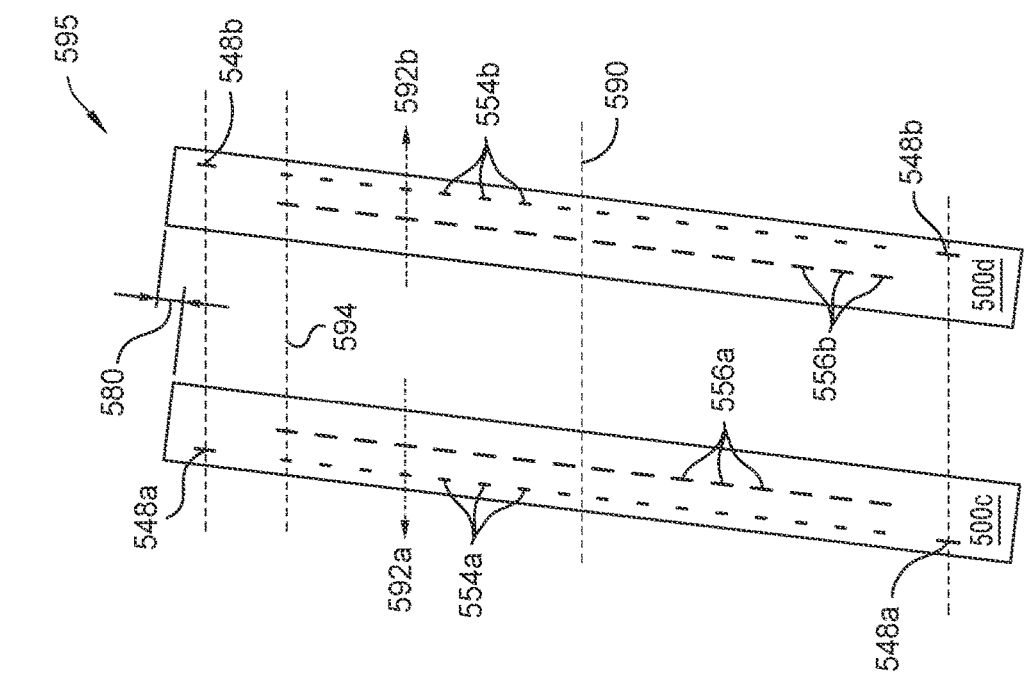
FIG. 5F illustrates a MFS view of a tape head comprising two SGV module head assemblies in a titled configuration, according to another embodiment.
Figure 5E:
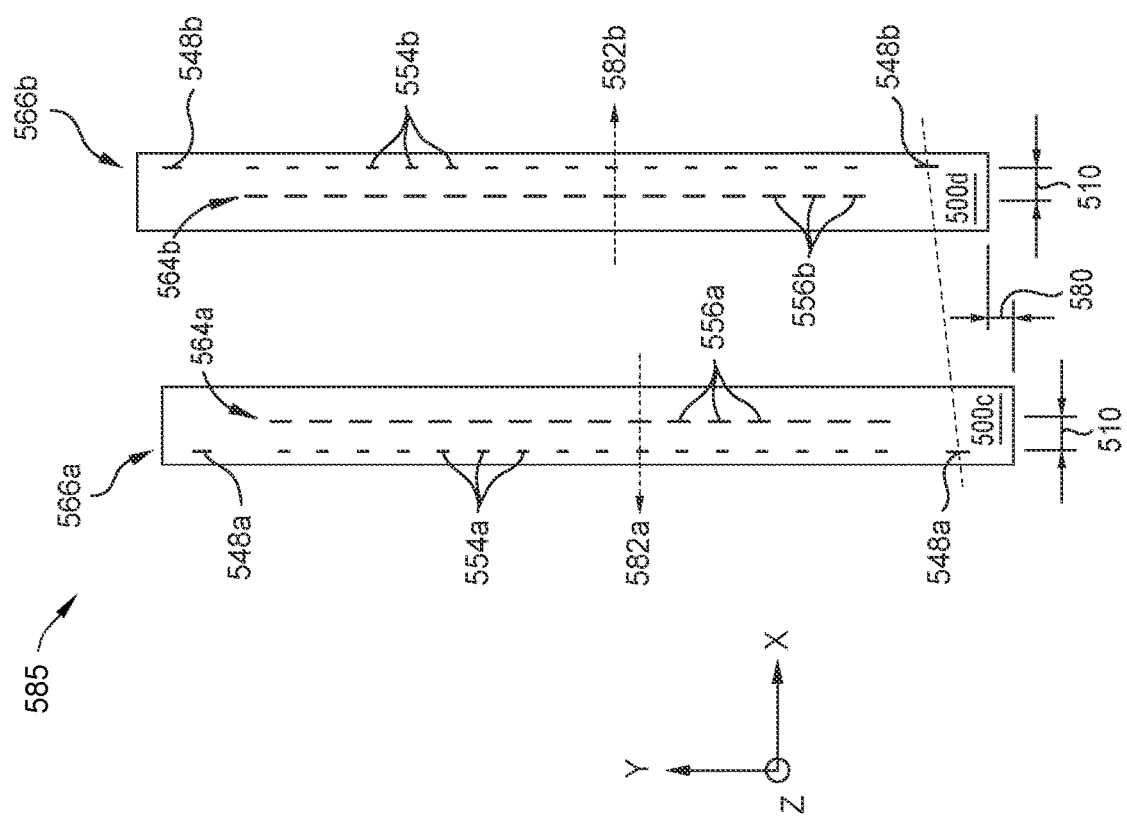
FIG. 5E illustrates a MFS view of a tape head comprising two SGV module head assemblies in an untilted configuration, according to another embodiment.

FIG. 5E illustrates a MFS view of a tape head comprising two SGV module head assemblies 500c, 500d in an untilted configuration 585, similar to FIG. 5A, according to one embodiment. FIG. 5F illustrates a MFS view of a tape head comprising two SGV module head assemblies 500c, 500d in a tilted configuration 595, similar to FIG. 5B, according to another embodiment. In FIGS. 5E-5F, the first SGV module 500c is unaligned or offset in the y-direction with the second SGV module 500d by an amount to ensure that the first and second SGV modules 500c, 500d will be aligned to one another when tilted by a predetermined amount. Each of the first SGV module 500c and the second SGV module 500d may be the SGV module 500 of FIGS. 5A-5B.

In FIGS. 5E-5F, the first SGV module head assembly 500c comprises two (2) first servo readers 548a, 16 first writers 556a, and 16 first readers 554a, forming 16 first writer 556a and first reader 554a pairs, where each of the first writers 556a is spaced the distance 510 from respective each of the first readers 554a. Similarly, the second SGV module head assembly 500b comprises two (2) second servo readers 548b, 16 second writers 556b, and 16 second readers 554b, forming 16 second writer 556b and second reader 554b pairs, where each of the second writers 556b is spaced the distance 510 from respective each of the second readers 554b. While two servo readers 548a, 548b are shown within each SGV module 500c, 500d, the SGV modules 500c, 500d may each individually comprise two servo readers 548a, 548b, four servo readers 548a, 548b, or more.

The first and second SGV modules 500c, 500d are identical but rotated 180° with respect to one another, and are disposed in a face-to-face arrangement. The first SGV module 500c is offset from the second SGV module 500d a distance 580 in the y-direction such that the angle created by the offset is the same as the angle shown in FIG. 5B. The first SGV module 500c operates as a tape (not shown) moves in a first direction indicated by arrow 592a, and the second SGV module 500d operates as a tape (not shown) moves in a second direction indicated by arrow 592b. The first direction indicated by arrow 592a may be a reverse direction of the tape and the second direction indicated by arrow 592b may be a forward direction of the tape.

The first writers 556a are disposed in a first row or column 564a in the y-direction, and the first readers 554a are disposed in a second row or column 566a in the y-direction adjacent to the row of first writers 556a, as shown in FIG. 5E. The first servo readers 548a are disposed at the ends of the second row or column 566a. The second writers 556b are disposed in a first row or column 564b in the y-direction, and the second readers 554b are disposed in a second row or column 566b in the y-direction adjacent to the row of second writers 564b. The second servo readers 548b are disposed at the ends of the second row or column 566b.

In the untilted configuration 585 of FIG. 5E, the first arrow 582a is aligned with a centerline of a first writer 556a and the second arrow 582b is aligned with a centerline of a second writer 556b, where the first and second arrows 582a, 582b are disposed parallel to the x-axis of the first and second SGV modules 500a, 500b. As shown in FIG. 5E, the first arrow 582a is unaligned with a paired first reader 554a, and the second arrow 582b is unaligned with a paired second reader 554b, as the readers 554a, 554b are unaligned with their paired writers 556a, 556b, like described in FIG. 5A.

However, in the tilted configuration 595 of FIG. 5F, a third arrow 592a is aligned with both a centerline of a first writer 556a and a centerline of a first reader 554a of the first SGV module 500c. Similarly, in the second SGV module 500d, a fourth arrow 592b is aligned with both a centerline of a second writer 556b and a centerline of a second reader 554b. Thus, each of the first writers 556a is accurately aligned with a paired first reader 554a in the x-direction (shown by arrow 592a pointing through a center of a first writer 556a and a center of a first reader 554a), and each of the second writers 556b is accurately aligned with a paired second reader 554b in the x-direction (shown by arrow 592b pointing through a center of a second writer 556b and a center of a second reader 554b).

As such, in the tilted configuration 595, the first writers 556a are aligned with the first readers 554a, and the second writers 556b are aligned with the second readers 554b. Thus, the writers 556a, 556b are able to write to the media, and the paired readers 554a, 554b, respectively, are able to read the data written by the paired writer 556a, 556b to verify the data was written correctly. As such, the first and second SGV module head assemblies 500c, 500d are able to independently write data to and read verify data from a tape concurrently.

Moreover, the first and second SGV modules 500c, 500d are able to read verify one another's data as well when the tracks of the SGV modules 500c, 500d are accurately aligned with one another in the x-direction. As further shown in FIG. 5F, for example by line 594, the first writers 556a and the first readers 554a of the first SGV module 500c are aligned with adjacent second writers 556b and second readers 554b of the second SGV module 500d. In other words, each of the first servo readers 548a, the first writers 556a, and the first readers 554a is accurately aligned in the x-direction with a corresponding each of the second servo readers 548b, the second writers 556b, and the second readers 554b. As such, the first SGV module 500c may write data to a tape, and the second SGV module 500d can read verify the data written by the first SGV module 500c, and vice versa.

It is to be understood that when the first SGV module 500c writes data and the second SGV module 500d read verifies the data, or vice versa, the writers 556a, 556b are writing to the tape that is moving in the opposite direction compared to when the first and second SGV modules 500c, 500d read verify their own written data. In other words, the trailing pole of the writers 556a, 556b is P1, versus the trailing pole being P2 when the first and second SGV modules 500c, 500d read verify their own written data.

Therefore, a SGV module head assembly of a tape head comprising a plurality of writer and reader pairs, the writer and reader of each pair being spaced a distance between about 5 μm to about 20 μm apart, enables the SGV module to write data to a portion of a tape or media, and to immediately read verify the newly written portion of the tape. As such, the SGV module is able to concurrently write data to and read verify data from a tape concurrently.

In one embodiment, a SGV module head assembly comprises a closure, a substrate disposed adjacent to the closure, and a plurality of write transducer and read transducer pairs disposed between the closure and the substrate. The write transducer and the read transducer of each pair are spaced a first distance in a first direction of about 5 µm to about 20 µm. The SGV module head assembly is controllable to write data to a tape using the write transducer of each pair and read verify the data using the read transducer of each pair.

The write transducer and the read transducer of each pair are aligned in the first direction on a center axis such that a centerline of the write transducer aligns with a centerline of the read transducer in each pair. The write transducer and the read transducer of each pair are offset in a second direction perpendicular to the first direction such that a centerline of the write transducer is spaced a second distance in the second direction from a centerline of the read transducer in each pair. The second distance is about 200 nm to about 2000 nm. The SGV module is configured to dynamically tilt between about 1° to about 12° from a center axis to align the centerline of the write transducer with the centerline of the read transducer in each pair. The closure is spaced a third distance of about 20 µm to about 100 µm from the substrate. A tape drive comprises the SGV module head assembly and a controller configured to control the SGV module head assembly to write data to the tape using the write transducer of each pair and read verify the data using the read transducer of each pair.

In another embodiment, a tape head comprises a first SGV module head assembly comprising: a plurality of first write transducers disposed in a first row on a first substrate, each first write transducer of the plurality of first write transducers having a first center axis, and a plurality of first read transducers disposed in a second row adjacent to the first row on the first substrate, each first read transducer of the plurality of first read transducers having a second center axis aligned with the first center axis of an adjacent first write transducer of the plurality of first write transducers. The first SGV module head assembly is controllable to write data to a tape using the plurality of first write transducers and read verify the data using the plurality of first read transducers.

The first row is spaced a first distance of about 5 µm to about 20 µm from the second row. The tape head further comprises a second SGV module head assembly comprising: a plurality of second write transducers disposed in a third row on a second substrate, each second write transducer of the plurality of second write transducers having a third center axis, and a plurality of second read transducers disposed in a fourth row adjacent to the third row on the second substrate, each second read transducer of the plurality of second read transducers having a fourth center axis aligned with the third center axis of an adjacent second write transducer of the plurality of second write transducers. The second SGV module head assembly is controllable to write data to the tape using the plurality of second write transducers and read verify the data using the plurality of second read transducers.

The first SGV module head assembly is aligned with the second SGV module head assembly such that the first, second, third, and fourth center axes are aligned. The plurality of first write transducers of the first SGV module head assembly are configured to write data to the tape and the plurality of second read transducers of the second SGV module head assembly are configured to read and verify the data. The first SGV module head assembly and the second SGV module head assembly are disposed in a face-to-face arrangement. The first SGV module head assembly is configured to write and read the data when the tape moves in a first direction. The second SGV module head assembly is configured to write and read the data when the tape moves in a second direction opposite the first direction.

The first SGV module head assembly is offset a second distance in a second direction perpendicular to the first direction from the second SGV module head assembly. The first SGV module head assembly and the second SGV module head assembly are each individually configured to dynamically tilt in a third direction. The first SGV module head assembly is aligned with the second SGV module head assembly such that the first, second, third, and fourth center axes are aligned when the first SGV module head assembly and the second SGV module head assembly are each tilted in the third direction. A tape drive comprises the tape head and a controller configured to control the first SGV module head assembly to write data to the tape using the plurality of first write transducers and read verify the data using the plurality of first read transducers.

In yet another embodiment, a tape head comprises a first SGV module head assembly comprising: a plurality of first write transducer and first read transducer pairs. The first write transducer and the first read transducer of each pair are spaced a first distance in a first direction of about 5 µm to about 20 µm. The first SGV module head assembly is controllable to write data to a tape using the first write transducer of each pair and read verify the data using the first read transducer of each pair. The tape head further comprises a second SGV module head assembly disposed adjacent to the first SGV module head assembly, the first SGV module head assembly and the second SGV module head assembly being disposed in a face-to-face arrangement. The second SGV module head assembly comprises: a plurality of second write transducer and second read transducer pairs. The second write transducer and the second read transducer of each pair are spaced a second distance in the first direction of about 5 µm to about 20 µm. The second SGV module head assembly is controllable to write data to a tape using the second write transducer of each pair and read verify the data using the second read transducer of each pair.

The first SGV module head assembly is offset a third distance in a second direction perpendicular to the first direction from the second SGV module head assembly. The first SGV module head assembly further comprises means for dynamically tilting the first SGV module head assembly. The second SGV module head assembly further comprises means for dynamically tilting the second SGV module head assembly. The means for dynamically tilting the first SGV module head assembly and the means for dynamically tilting the second SGV module head assembly align the plurality of first write transducer and first read transducer pairs with the plurality of second write transducer and second read transducer pairs in the first direction.

The plurality of first write transducers of the first SGV module head assembly are configured to write data to the tape and the plurality of second read transducers of the second SGV module head assembly are configured to read and verify the data. The first write transducer and the first read transducer of each pair are offset in a second direction perpendicular to the first direction, and the second write transducer and the second read transducer of each pair are offset in the second direction. A tape drive comprises the tape head and a controller configured to control the first SGV module head assembly to write data to the tape using the first write transducer of each pair and read verify the data using the first read transducer of each pair, and to control the second SGV module head assembly to write data to the tape using the second write transducer of each pair and read verify the data using the second read transducer of each pair.

In another embodiment, a tape drive comprises a tape head comprising a first SGV module head assembly, the first SGV module head assembly comprising: a plurality of first write transducer and first read transducer pairs disposed on a first substrate, the first write transducer and the first read transducer of each first write transducer and first read transducer pair being spaced a first distance in a first direction of about 5 µm to about 20 µm, such that the first SGV module head assembly is controllable to write data to a tape using the first write transducer of each first write transducer and first read transducer pair and read and verify the data using the first read transducer of each first write transducer and first read transducer pair. The tape drive is configured to dynamically tilt the first SGV module in a second direction and a third direction opposite to the second direction.

The first SGV module head assembly is statically tilted in the second direction with respect to the tape. The first write transducer of each first write transducer and first read transducer pair has a first center axis and the first read transducer of each first write transducer and first read transducer pair has a second center axis. The first center axis is unaligned with the second center axis in each first write transducer and first read transducer pair, and wherein dynamically tilting the first SGV module head assembly aligns the first center axis with the second center axis in each first write transducer and first read transducer pair. The first center axis is aligned with the second center axis in each first write transducer and first read transducer pair.

The tape head further comprises: a second SGV module head assembly disposed parallel to the first SGV module head assembly, the second SGV module head assembly comprising: a plurality of second write transducer and second read transducer pairs disposed on a second substrate, the second write transducer and the second read transducer of each second write transducer and second read transducer pair being spaced a second distance in the first direction of about 5 µm to about 20 µm, such that the second SGV module head assembly is controllable to write data to the tape using the second write transducer of each second write transducer and second read transducer pair and read and verify the data using the second read transducer of each second write transducer and second read transducer pair. The tape drive is configured to dynamically tilt the second SGV module in the second direction and the third direction.

The first SGV module head assembly is statically tilted in the second direction with respect to the tape. The second write transducer of each second write transducer and second read transducer pair has a third center axis and the second read transducer of each second write transducer and second read transducer pair has a fourth center axis. The third center axis is unaligned with the fourth center axis in each second write transducer and second read transducer pair, and wherein dynamically tilting the second SGV module head assembly aligns the third center axis with the fourth center axis in each second write transducer and second read transducer pair. The third center axis is aligned with the fourth center axis in each second write transducer and second read transducer pair.

The first SGV module head assembly is disposed at a first height within the tape head and the second SGV module head assembly is disposed at a second height within the tape head offset from the first height a third distance in a fourth direction perpendicular to the first direction. The first write transducer of each first write transducer and first read transducer pair has a first center axis and the first read transducer of each first write transducer and first read transducer pair has a second center axis, and wherein dynamically tilting the first SGV module head assembly and dynamically tilting the second SGV module head assembly aligns the first center axis and the second center axis of each first write transducer and first read transducer pair with the third center axis and the fourth center axis in each second write transducer and second read transducer pair.

The plurality of first write transducers of the first SGV module head assembly are configured to write data to the tape and the plurality of second read transducers of the second SGV module head assembly are configured to read and verify the data. The tape drive further comprises a controller configured to control the first SGV module head assembly to write data to the tape using the first write transducer of each first write transducer and first read transducer pair and read verify the data using the first read transducer of each first write transducer and first read transducer pair, and to control the second SGV module head assembly to write data to the tape using the second write transducer of each second write transducer and second read transducer pair and read verify the data using the second read transducer of each second write transducer and second read transducer pair.

While the foregoing is directed to embodiments of the present disclosure, other and further embodiments of the disclosure may be devised without departing from the basic scope thereof, and the scope thereof is determined by the claims that follow.

What is claimed is:

1. A same gap verify (SGV) module head assembly, comprising:
   a closure;
   a substrate disposed adjacent to the closure; and
   a plurality of write transducer and read transducer pairs disposed between the closure and the substrate, the write transducer and the read transducer of each pair being spaced a first distance in a first direction of about 5 µm to about 20 µm, such that the SGV module head assembly is controllable to write data to a tape using the write transducer of each pair and read verify the data using the read transducer of each pair.

2. The SGV module head assembly of claim 1, wherein the write transducer and the read transducer of each pair are aligned in the first direction on a center axis such that a centerline of the write transducer aligns with a centerline of the read transducer in each pair.

3. The SGV module head assembly of claim 1, wherein the write transducer and the read transducer of each pair are offset in a second direction perpendicular to the first direction such that a centerline of the write transducer is spaced a second distance in the second direction from a centerline of the read transducer in each pair.

4. The SGV module head assembly of claim 3, wherein the second distance is about 200 nm to about 2000 nm.

5. The SGV module head assembly of claim 3, wherein the SGV module is configured to dynamically tilt between about 1° to about 12° from a center axis to align the centerline of the write transducer with the centerline of the read transducer in each pair.

6. The SGV module head assembly of claim 1, wherein the closure is spaced a third distance of about 20 µm to about 100 µm from the substrate.

7. A tape drive, comprising:
   the SGV module head assembly of claim 1; and a controller configured to control the SGV module head assembly to write data to the tape using the write transducer of each pair and read verify the data using the read transducer of each pair.

8. A tape head, comprising:
a first same gap verify (SGV) module head assembly, comprising:
a plurality of first write transducers disposed in a first row on first a substrate, each first write transducer of the plurality of first write transducers having a first center axis; and
a plurality of first read transducers disposed in a second row adjacent to the first row on the first substrate, each first read transducer of the plurality of first read transducers having a second center axis aligned with the first center axis of an adjacent first write transducer of the plurality of first write transducers, such that the first SGV module head assembly is controllable to write data to a tape using the plurality of first write transducers and read verify the data using the plurality of first read transducers, wherein the first row is spaced a first distance of about 5 µm to about 20 µm from the second row.

9. The tape head of claim 8, further comprising:
a second SGV module head assembly, comprising:
a plurality of second write transducers disposed in a third row on a second substrate, each second write transducer of the plurality of second write transducers having a third center axis; and
a plurality of second read transducers disposed in a fourth row adjacent to the third row on the second substrate, each second read transducer of the plurality of second read transducers having a fourth center axis aligned with the third center axis of an adjacent second write transducer of the plurality of second write transducers, such that the second SGV module head assembly is controllable to write data to the tape using the plurality of second write transducers and read verify the data using the plurality of second read transducers.

10. The tape head of claim 9, wherein the first SGV module head assembly is aligned with the second SGV module head assembly such that the first, second, third, and fourth center axes are aligned.

11. The tape head of claim 9, wherein the plurality of first write transducers of the first SGV module head assembly are configured to write data to the tape and the plurality of second read transducers of the second SGV module head assembly are configured to read and verify the data.

12. The tape head of claim 9, wherein the first SGV module head assembly and the second SGV module head assembly are disposed in a face-to-face arrangement.

13. The tape head of claim 9, wherein the first SGV module head assembly is configured to write and read the data when the tape moves in a first direction, and wherein the second SGV module head assembly is configured to write and read the data when the tape moves in a second direction opposite the first direction.

14. The tape head of claim 9, wherein the first SGV module head assembly is offset a second distance in a second direction perpendicular to the first direction from the second SGV module head assembly, and wherein the first SGV module head assembly and the second SGV module head assembly are each individually configured to dynamically tilt in a third direction.

15. The tape head of claim 14, wherein the first SGV module head assembly is aligned with the second SGV module head assembly such that the first, second, third, and fourth center axes are aligned when the first SGV module head assembly and the second SGV module head assembly are each tilted in the third direction.

16. A tape drive, comprising:
the tape head of claim 8; and
a controller configured to control the first SGV module head assembly to write data to the tape using the plurality of first write transducers and read verify the data using the plurality of first read transducers.

17. A tape head, comprising:
a first same gap verify (SGV) module head assembly, comprising:
a plurality of first write transducer and first read transducer pairs, the first write transducer and the first read transducer of each pair being spaced a first distance in a first direction of about 5 µm to about 20 µm, such that the first SGV module head assembly is controllable to write data to a tape using the first write transducer of each pair and read and verify the data using the first read transducer of each pair; and
a second SGV module head assembly disposed adjacent to the first SGV module head assembly, the first SGV module head assembly and the second SGV module head assembly being disposed in a face-to-face arrangement, the second SGV module head assembly comprising:
a plurality of second write transducer and second read transducer pairs, the second write transducer and the second read transducer of each pair being spaced a second distance in the first direction of about 5 µm to about 20 µm, such that the second SGV module head assembly is controllable to write data to a tape using the second write transducer of each pair and read verify the data using the second read transducer of each pair.

18. The tape head of claim 17, wherein the first SGV module head assembly is offset a third distance in a second direction perpendicular to the first direction from the second SGV module head assembly.

19. The tape head of claim 17, wherein the first SGV module head assembly further comprises means for dynamically tilting the first SGV module head assembly, and wherein the second SGV module head assembly further comprises means for dynamically tilting the second SGV module head assembly.

20. The tape head of claim 19, wherein the means for dynamically tilting the first SGV module head assembly and the means for dynamically tilting the second SGV module head assembly align the plurality of first write transducer and first read transducer pairs with the plurality of second write transducer and second read transducer pairs in the first direction.

21. The tape head of claim 20, wherein the plurality of first write transducers of the first SGV module head assembly are configured to write data to the tape and the plurality of second read transducers of the second SGV module head assembly are configured to read and verify the data.

22. The tape head of claim 17, wherein the first write transducer and the first read transducer of each pair are offset in a second direction perpendicular to the first direction, and the second write transducer and the second read transducer of each pair are offset in the second direction.

23. A tape drive, comprising:
the tape head of claim 17; and
a controller configured to control the first SGV module head assembly to write data to the tape using the first write transducer of each pair and read verify the data using the first read transducer of each pair, and to control the second SGV module head assembly to write data to the tape using the second write transducer of each pair and read verify the data using the second read transducer of each pair.

24. A tape drive, comprising:
a tape head comprising a first same gap verify (SGV) module head assembly, the first SGV module head assembly comprising:
   a plurality of first write transducer and first read transducer pairs disposed on a first substrate, the first write transducer and the first read transducer of each first write transducer and first read transducer pair being spaced a first distance in a first direction of about 5 μm to about 20 μm, such that the first SGV module head assembly is controllable to write data to a tape using the first write transducer of each first write transducer and first read transducer pair and read and verify the data using the first read transducer of each first write transducer and first read transducer pair,
wherein the tape drive is configured to dynamically tilt the first SGV module in a second direction and a third direction opposite to the second direction.

25. The tape drive of claim 24, wherein the first SGV module head assembly is statically tilted in the second direction with respect to the tape.

26. The tape drive of claim 24, wherein the first write transducer of each first write transducer and first read transducer pair has a first center axis and the first read transducer of each first write transducer and first read transducer pair has a second center axis.

27. The tape drive of claim 26, wherein the first center axis is unaligned with the second center axis in each first write transducer and first read transducer pair, and wherein dynamically tilting the first SGV module head assembly aligns the first center axis with the second center axis in each first write transducer and first read transducer pair.

28. The tape drive of claim 26, wherein the first center axis is aligned with the second center axis in each first write transducer and first read transducer pair.

29. The tape drive of claim 24, wherein the tape head further comprises:
   a second SGV module head assembly disposed parallel to the first SGV module head assembly, the second SGV module head assembly comprising:
      a plurality of second write transducer and second read transducer pairs disposed on a second substrate, the second write transducer and the second read transducer of each second write transducer and second read transducer pair being spaced a second distance in the first direction of about 5 μm to about 20 μm, such that the second SGV module head assembly is controllable to write data to the tape using the second write transducer of each second write transducer and second read transducer pair and read and verify the data using the second read transducer of each second write transducer and second read transducer pair,
   wherein the tape drive is configured to dynamically tilt the second SGV module in the second direction and the third direction.

30. The tape drive of claim 29, wherein the first SGV module head assembly is statically tilted in the second direction with respect to the tape.

31. The tape drive of claim 29, wherein the second write transducer of each second write transducer and second read transducer pair has a third center axis and the second read transducer of each second write transducer and second read transducer pair has a fourth center axis.

32. The tape drive of claim 31, wherein the third center axis is unaligned with the fourth center axis in each second write transducer and second read transducer pair, and wherein dynamically tilting the second SGV module head assembly aligns the third center axis with the fourth center axis in each second write transducer and second read transducer pair.

33. The tape drive of claim 31, wherein the third center axis is aligned with the fourth center axis in each second write transducer and second read transducer pair.

34. The tape drive of claim 31, wherein the first SGV module head assembly is disposed at a first height within the tape head and the second SGV module head assembly is disposed at a second height within the tape head offset from the first height a third distance in a fourth direction perpendicular to the first direction.

35. The tape drive of claim 31, wherein the first write transducer of each first write transducer and first read transducer pair has a first center axis and the first read transducer of each first write transducer and first read transducer pair has a second center axis, and wherein dynamically tilting the first SGV module head assembly and dynamically tilting the second SGV module head assembly aligns the first center axis and the second center axis of each first write transducer and first read transducer pair with the third center axis and the fourth center axis in each second write transducer and second read transducer pair.

36. The tape drive of claim 29, wherein the plurality of first write transducers of the first SGV module head assembly are configured to write data to the tape and the plurality of second read transducers of the second SGV module head assembly are configured to read and verify the data.

37. The tape drive of claim 29, further comprising:
   a controller configured to control the first SGV module head assembly to write data to the tape using the first write transducer of each first write transducer and first read transducer pair and read verify the data using the first read transducer of each first write transducer and first read transducer pair, and to control the second SGV module head assembly to write data to the tape using the second write transducer of each second write transducer and second read transducer pair and read verify the data using the second read transducer of each second write transducer and second read transducer pair.

* * * * *